United States Patent
Fan et al.

(10) Patent No.: US 12,475,878 B2
(45) Date of Patent: Nov. 18, 2025

(54) VOICE CONVERSION METHOD AND RELATED DEVICE

(71) Applicant: HUAWEI TECHNOLOGIES CO., LTD., Guangdong (CN)

(72) Inventors: Fan Fan, Shenzhen (CN); Jinghao Luo, Shenzhen (CN); Shuo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

(21) Appl. No.: 18/186,285

(22) Filed: Mar. 20, 2023

(65) Prior Publication Data
US 2023/0223006 A1 Jul. 13, 2023

Related U.S. Application Data

(63) Continuation of application No. PCT/CN2021/117945, filed on Sep. 13, 2021.

(30) Foreign Application Priority Data

Sep. 21, 2020 (CN) .......................... 202010996501.5

(51) Int. Cl.
*G10L 13/033* (2013.01)
*G10L 13/04* (2013.01)
*G10L 15/02* (2006.01)

(52) U.S. Cl.
CPC ............ *G10L 13/033* (2013.01); *G10L 13/04* (2013.01); *G10L 15/02* (2013.01); *G10L 2015/025* (2013.01)

(58) Field of Classification Search
CPC ....... G10L 13/033; G10L 13/04; G10L 15/02; G10L 2015/025; G10L 21/003; G10L 25/30; H04M 1/72403; H04M 1/72433
See application file for complete search history.

(56) References Cited

U.S. PATENT DOCUMENTS 11,361,753 B2 * 6/2022 Pan .......................... G10L 13/10
11,741,941 B2 * 8/2023 Richards ................. G06F 3/167
704/259

(Continued)

FOREIGN PATENT DOCUMENTS

| CN | 105390141 A | 3/2016 |
| CN | 106328126 A | 1/2017 |

(Continued)

OTHER PUBLICATIONS

International Search Report and Written Opinion issued in PCT/CN2021/117945, dated Nov. 18, 2021, 11 pages.

(Continued)

*Primary Examiner* — Bhavesh M Mehta
*Assistant Examiner* — Jangwoen Lee

(57) ABSTRACT

A voice conversion method and a related device are provided to implement diversified human voice beautification. The method includes receiving a mode selection operation input by a user, where the mode selection operation is for selecting a voice conversion mode. A plurality of provided selectable modes include a style conversion mode, for performing speaking style conversion on a to-be-converted first voice; a dialect conversion mode, for adding an accent to or removing an accent from the first voice; and a voice enhancement mode, for implementing voice enhancement on the first voice. The three modes have corresponding voice conversion networks. Based on a target conversion mode selected by the user, a target voice conversion network corresponding to the target conversion mode is selected to convert the first voice, and output a second voice obtained through conversion.

20 Claims, 14 Drawing Sheets

(56) References Cited

U.S. PATENT DOCUMENTS

2018/0033428 A1    2/2018  Kim et al.
2021/0250257 A1*   8/2021  Ringenberg ....... H04N 21/6587

FOREIGN PATENT DOCUMENTS

| CN | 108962217 | A |   | 12/2018 |            |
|----|-----------|---|---|---------|------------|
| CN | 109616127 | A |   | 4/2019  |            |
| CN | 110223705 | A | * | 9/2019  | G10L 25/30 |
| CN | 105551480 | B |   | 10/2019 |            |
| CN | 110580906 | A |   | 12/2019 |            |
| CN | 111276120 | A |   | 6/2020  |            |
| CN | 111627457 | A |   | 9/2020  |            |

OTHER PUBLICATIONS

Office Action issued in CN202010996501.5, dated Oct. 24, 2024, 12 pages.

\* cited by examiner

VOICE CONVERSION METHOD AND RELATED DEVICE

CROSS-REFERENCE TO RELATED APPLICATION

This application is a continuation of International Application No. PCT/CN2021/117945, filed on Sep. 13, 2021, which claims priority to Chinese Patent Application No. 202010996501.5, filed on Sep. 21, 2020. The disclosures of the aforementioned applications are hereby incorporated by reference in their entireties.

TECHNICAL FIELD

The present disclosure relates to the field of voice processing technologies, and in particular, to a voice conversion method and a related device.

BACKGROUND

Human voice beautification refers to modification and beautification of sound to produce pleasant auditory effect. Currently, voice recording functions of many recording software or social applications (APPs) on the market have a specific capability of human voice beautification. For example, denoising a voice, increasing voice clarity or voice volume, or the like is merely modifying a voice feature of a speaker, and a human voice beautification mode is excessively undiversified.

SUMMARY

Embodiments of the present disclosure provide a voice conversion method and a related device, to provide a plurality of human voice beautification modes and implement diversified human voice beautification.

According to a first aspect, an embodiment of the present disclosure provides a voice conversion method. The method is applied to a voice conversion apparatus. For example, the apparatus may be a terminal, and the method may include: A terminal receives a mode selection operation input by a user, where the mode selection operation is for selecting a voice conversion mode; the terminal selects a target conversion mode from a plurality of modes based on the mode selection operation, where the plurality of modes include a style conversion mode, a dialect conversion mode, and a voice enhancement mode; the terminal may select a target voice conversion network corresponding to the target conversion mode, and implement voice conversion over the target voice conversion network; the terminal device obtains a to-be-converted first voice, and further extracts feature information of the first voice, where the feature information is for retaining content information of the first voice; the terminal inputs the feature information of the first voice into a target voice conversion network corresponding to the target conversion mode, and outputs, over the target voice conversion network, a second voice obtained through conversion; and finally, the terminal outputs the second voice.

This embodiment provides the plurality of selectable modes, for example, the style conversion mode, for performing speaking style conversion on the first voice; the dialect conversion mode, for adding an accent or removing an accent; and the voice enhancement mode, for implementing voice enhancement. The three modes have corresponding voice conversion networks. The first voice can be converted over the voice conversion network corresponding to the mode based on a requirement of the user. Therefore, this implements diversified human voice beautification and satisfies requirements of the user in different application scenarios.

In an optional implementation, the extracting feature information of the first voice may specifically include: The terminal inputs the feature information of the first voice into a voice feature extraction model, and extracts a phoneme posteriorgram (PPG) feature of the first voice by using the voice feature extraction model, where the PPG feature is for retaining the content information of the first voice. The PPG feature describes a probability of each phoneme in a phoneme set corresponding to a voice frame, and is equivalent to recognizing the phoneme. The PPG feature is for retaining the content information of the first voice. In this example, the voice does not need to be converted into a text to retain the content information of the voice, instead, voice input is directly performed, and the content information of the first voice is retained by using the PPG feature, so that robustness can be improved.

In an optional implementation, when the target conversion mode is the style conversion mode, and the target voice conversion network is a style conversion network, the style conversion network includes a style separation model and a voice fusion model, and the method may further include: The terminal obtains a third voice for extracting a style feature, inputs the third voice into the style separation model, separates the style feature of the third voice by using the style separation model, and then further inputs the style feature and the feature information of the first voice into the voice fusion model for fusion, to obtain the second voice.

In this embodiment, the terminal receives the to-be-converted first voice and the third voice for extracting the style feature, then inputs the first voice into the voice feature extraction model, and extracts the PPG feature by using the voice feature extraction model. The PPG feature is for retaining the content information of the first voice, and a voice is directly input by using the PPG feature. The terminal inputs the third voice into the style separation model, separates the style feature of the third voice by using the style separation model, and finally inputs the style feature and the PPG feature into the voice fusion model for fusion, to obtain the second voice fusing the content of the first voice and the style of the third voice. The third voice may be a voice of any person, so that the first voice is converted into a voice style of any person, to implement diversified voice style conversion. In an optional implementation, the style feature includes a first feature, the first feature includes a plurality of sub-features, and the inputting the third voice into the style separation model, and separating the style feature of the third voice by using the style separation model may specifically include: The terminal inputs the third voice into the style separation model, and extracts a vector of the first feature of the third voice by using the style separation model, for example, the first feature may be a timbre; then, the terminal inputs the third voice into a sub-feature extraction model, and extracts a vector of the sub-feature by using the sub-feature extraction model; the terminal receives a weight of each of the plurality of sub-features that is input by the user; and the terminal determines the style feature of the third voice based on the vector of the first feature, the vector of the sub-feature, and the weight of the sub-feature.

In this embodiment, a similarity between styles of the to-be-converted voice and the third voice (namely, a voice corresponding to a target template) is adjusted by using the weight that corresponds to each sub-feature and that is input by the user, where the similarity is determined by the weight input by the user. The similarity between styles of a finally output voice and the third voice is determined by the weight. The user may flexibly adjust the style of the to-be-converted voice by adjusting the input weight. The style of the to-be-converted voice may be completely the same as the style of the third voice, or may be changed based on the style of the third voice, to implement diversified styles of the to-be-converted voice.

In an optional implementation, the determining the style feature of the third voice based on the vector of the first feature, the vector of the sub-feature, and the weight of the sub-feature may include: The terminal inputs the vector of the first feature into a multi-head attention structure, inputs the vector of the sub-feature and a product of the vector of the sub-feature and the weight corresponding to the sub-feature into the multi-head attention structure, and outputs the style feature of the third voice by using the multi-head attention structure.

In this embodiment, the multi-head attention structure enables a model to extract a feature expression from different subspaces. Each head corresponds to one sub-feature space in a high-dimensional space. This is equivalent to decomposing the high-dimensional space, and each head is responsible for one sub-feature space. A multi-head attention mechanism is equivalent to a plurality of attention mechanisms having a same structure, so that a result output by the multi-head attention mechanism includes some timbres of the third voice.

In an optional implementation, the obtaining a third voice for extracting a style feature may include:

The terminal receives a template selection operation input by the user. The template selection operation is for selecting a target template. For example, the target template may be a style of a male announcer, or may be a style of a voice of a "female announcer". The terminal obtains a voice corresponding to the target template, uses the voice corresponding to the target template as the third voice, and fuses the style feature of the third voice into the first voice, to implement diversified voice styles.

In an optional implementation, the obtaining a third voice for extracting a style feature may specifically include: The terminal may further receive the third voice input by a second speaker, where the first voice is a voice of a first speaker, and the second speaker is any person different from the first speaker, to implement diversified voice styles.

In an optional implementation, when the target conversion mode is the dialect conversion mode, and the target voice conversion network is a dialect conversion network, the inputting the feature information of the first voice into a target voice conversion network corresponding to the target conversion mode, and outputting, over the target voice conversion network, a second voice obtained through conversion may further specifically include: The terminal inputs the feature information of the first voice into the dialect conversion network, and outputs the second voice over the dialect conversion network. The first voice is a voice of a first dialect, and the second voice is a voice of a second dialect. This implements dialect conversion, enhances communication convenience of users in different regions, and implements diversified voice conversion.

In an optional implementation, the dialect conversion network includes a plurality of dialect conversion models, and each dialect conversion model is for a different dialect to be converted. The method further includes: The terminal may receive a selection operation input by the user; and the terminal inputs the feature information of the first voice into a dialect conversion model corresponding to the selection operation, and outputs the second voice by using the dialect conversion model corresponding to the selection operation. In this embodiment, the terminal may select a corresponding dialect conversion model based on a specific operation input by the user.

In an optional implementation, the method further includes: The terminal inputs the first voice into a style separation model, and separates a style feature of the first voice by using the style separation model; and then, the terminal inputs the style feature of the first voice and the feature information of the first voice into the dialect conversion network, and outputs the second voice over the dialect conversion network, where a style of the second voice is the same as that of the first voice.

In this embodiment, content of the second voice is the same as content of the input voice (the first voice), and a speaking style of the input voice (the first voice) is retained.

In an optional implementation, the first voice is a far-field voice. When the target conversion mode is the voice enhancement mode, and the target voice conversion network is a voice enhancement model, the inputting the feature information of the first voice is input into the target voice conversion network corresponding to the target conversion mode, and outputting, over the target voice conversion network, a second voice obtained through conversion may include: The terminal inputs the feature information of the first voice into a voice enhancement model corresponding to the mode, and outputs the second voice by using the voice enhancement model, where the second voice is a near-field voice. In this example, the far-field voice is converted into the near-field voice, to implement voice enhancement, increase voice clarity, increase application scenarios, and implement diversified voice conversion.

In an optional implementation, the method further includes: The terminal inputs the first voice into a style separation model, and separates a style feature of the first voice by using the style separation model; and then, the terminal inputs the style feature of the first voice and the feature information of the first voice into the voice enhancement model, and outputs the second voice by using the voice enhancement model, where a style of the second voice is the same as that of the first voice. In this example, the voice obtained through conversion is the same as the input voice (the first voice), and a speaking style of the input voice (the first voice) is retained.

In an optional implementation, the obtaining a to-be-converted first voice may include: receiving the first voice input by the first speaker; or selecting the first voice from a local storage file.

According to a second aspect, an embodiment of the present disclosure provides a voice conversion apparatus. The apparatus has a function performed by the terminal in the first aspect. The function may be implemented by hardware, or may be implemented by hardware executing corresponding software. The hardware or the software includes one or more modules corresponding to the foregoing function.

According to a third aspect, an embodiment of the present disclosure provides a terminal, including a processor, where the processor is coupled to at least one memory, and the processor is configured to read a computer program stored in the at least one memory, so that the terminal performs the method in any implementation of the first aspect.

According to a fourth aspect, an embodiment of the present disclosure provides a computer-readable medium. The computer-readable storage medium stores a computer program, and when the computer program is run on a computer, the computer is enabled to perform the method in the first aspect.

According to a fifth aspect, the present disclosure provides a chip system. The chip system includes a processor, configured to support a terminal device in implementing functions in the foregoing aspects. In a possible design, the chip system further includes a memory. The memory is configured to store program instructions and data that are necessary for the terminal device. The chip system may include a chip, or may include a chip and another discrete component.

DESCRIPTION OF EMBODIMENTS

Figure 1:
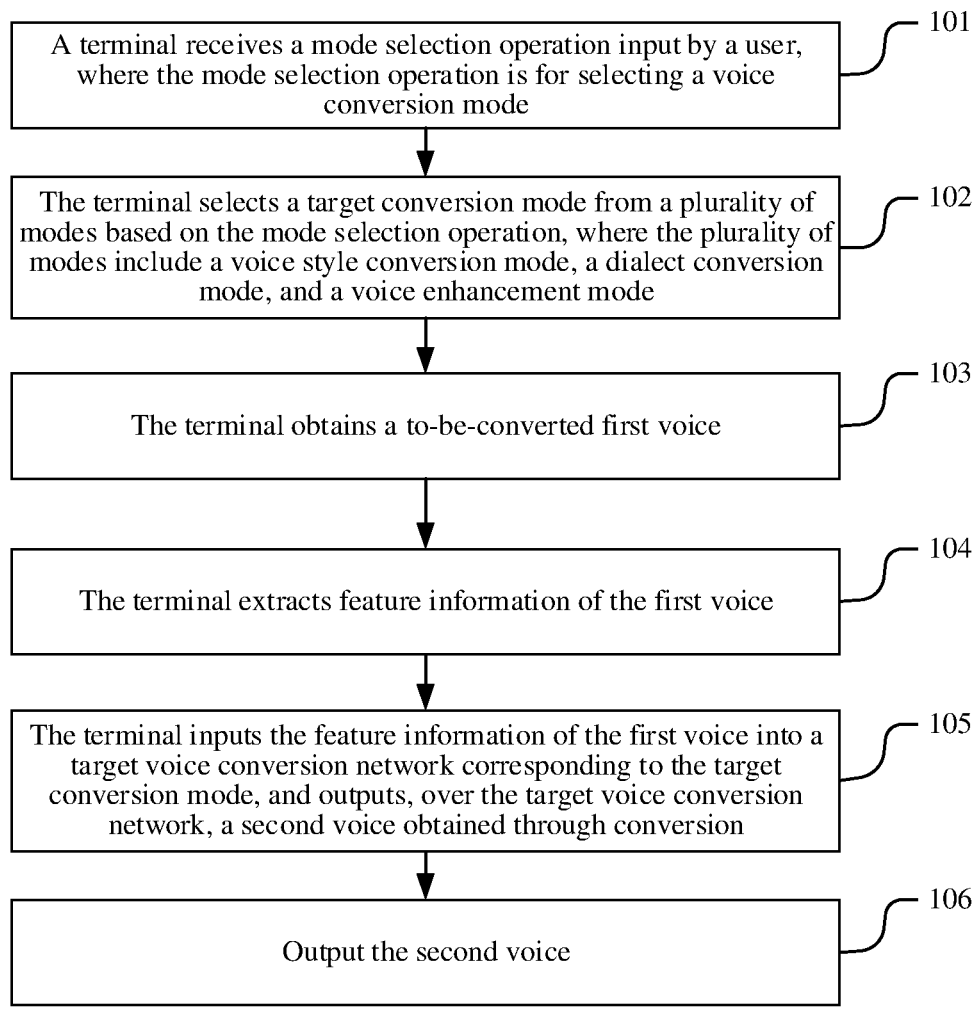
FIG. 1 is a flowchart of steps of an embodiment of a voice conversion method according to an embodiment of the present disclosure.

The following describes the technical solutions in embodiments of the present disclosure with reference to the accompanying drawings in embodiments of this application. The term "and/or" in this application describes only an association relationship for describing associated objects and represents that any one of three relationships may exist. For example, A and/or B may represent any one of the three cases: Only A exists, both A and B exist, and only B exists. In addition, the character "/" in the present disclosure generally indicates an "or" relationship between the associated objects. In the specification, claims, and accompanying drawings of the present disclosure, the terms "first", "second", and so on are intended to distinguish between similar objects but do not necessarily indicate a specific order or sequence. It should be understood that the terminology termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules expressly listed, but may include other steps or modules not expressly listed or inherent to such a process, method, product, or device.

Embodiments of the present disclosure provide a sound conversion method. The method is applied to a terminal. The terminal may be an intelligent terminal having a voice function, such as a mobile phone, a tablet computer, a notebook computer, or a smartwatch. The terminal device may also be referred to as a terminal device, user equipment (UE), or the like. The terminal device may be described by using a mobile phone as an example. A voice processing neural network is configured in the terminal device, and the voice processing neural network mainly includes a style conversion network, a dialect conversion network, and a voice enhancement model. The voice processing neural network implements voice conversion (beautification). The present disclosure provides a plurality of selectable modes, for example, a style conversion mode, for performing speaking style conversion on a first voice; a dialect conversion mode, for adding an accent or removing an accent; and a voice enhancement mode, for implementing voice enhancement. The three modes have corresponding voice conversion networks. The terminal selects, based on a target conversion mode selected by a user, a target voice conversion network corresponding to the target conversion mode to convert the obtained to-be-converted first voice, and output a second voice obtained through conversion. Therefore, this implements diversified human voice beautification and satisfies requirements of the user in different application scenarios.

To better understand the present disclosure, words in the present disclosure are first described.

Sequence to sequence (seq2seq) neural network: seq2seq belongs to an encoding (encoder)-decoding (decoder) structure. An input sequence is compressed into a vector of a specified length by using an encoder, and then the vector is input into a decoder to obtain an output sequence. The seq2seq neural network means that both the encoder and the decoder include a neural network. The encoder is configured to encode the input sequence according to a specific rule to generate the vector. The decoder is configured to convert the generated vector into the output sequence.

Attention structure: A plurality of vectors of a specified length are generated at an encoder. Each vector is obtained by weighting an input feature. A weight is related to an output of a decoder. The purpose is to enable the output of the decoder to focus more on different key parts of an input instead of the entire input.

Neural network vocoder: The neural network vocoder is essentially a neural network, and is configured to convert an output feature of a voice processing neural network into a highly natural voice.

Style feature: The style feature includes but is not limited to a timbre. The timbre refers to quality of a voice, which is referred to as tone quality. The timbre can reflect unique quality of a sound made by a speaker. The timbre includes but is not limited to a rhythm, an accent, and a speaking speed.

Phoneme: The phoneme is the smallest phonetic unit of a pronunciation action. For example, for hao (good), there are three phonemes in total, and for wo (me), there are two phonemes in total.

Phoneme posteriorgram (PPG) feature: The phoneme posteriorgram is a posterior probability that each voice frame belongs to a group of predefined voice units (phoneme or triphoneme/assistant phoneme), and these voice units retain a language and voice information of the voice.

Mel feature: A voice signal being stored as a waveform diagram feature is represented as feature transformation in time domain of the voice signal. However, frequency distribution of the voice signal cannot be learned only based on the waveform diagram feature. By analyzing frequency domain of the voice signal, a voice feature can be extracted. As a feature representation of the voice signal, the mel feature can clearly represent a feature of a voice resonance peak.

Refer to FIG. 1. This application provides an embodiment of a voice conversion method. The method is performed by a terminal device. Alternatively, the method may be performed by a processor in the terminal device, or the method may be performed by a chip in the terminal device. In this embodiment of this application, for example, the method is performed by a terminal. An example in which the terminal is a mobile phone is used for description. A voice processing neural network is configured in the terminal, and the voice processing neural network mainly includes a style conversion network, a dialect conversion network, and a voice enhancement network.

Step 101: The terminal receives a mode selection operation input by a user, where the mode selection operation is for selecting a voice conversion mode.

Figure 2:
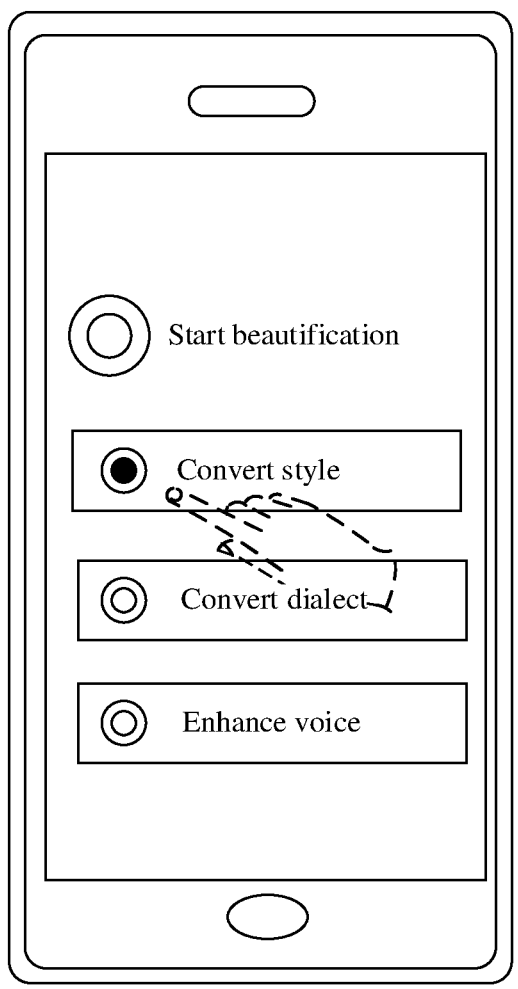
FIG. 2 is a schematic diagram of a scenario of a selection mode according to an embodiment of the present disclosure.

Refer to FIG. 2. The mode selection operation may be a tap operation, and a plurality of modes include a style conversion mode, a dialect conversion mode, and a voice enhancement mode. Each mode has a corresponding voice conversion network, and the voice is converted over the corresponding voice conversion network. For example, the style conversion mode is for converting a voice style. The dialect conversion mode is for dialect conversion, for example, adding an accent or removing an accent. The voice enhancement mode is for converting a far-field voice into a near-field voice.

Step 102: The terminal selects a target conversion mode from a plurality of modes based on the mode selection operation, where the plurality of modes include the style conversion mode, the dialect conversion mode, and the voice enhancement mode.

A list of the plurality of modes may be displayed in a display interface of the terminal. A user selects a target conversion mode in the plurality of modes by performing a tap operation based on a requirement. The target conversion mode may be any one of the foregoing three modes.

The terminal selects a target voice conversion network corresponding to the target conversion mode.

Figure 3:
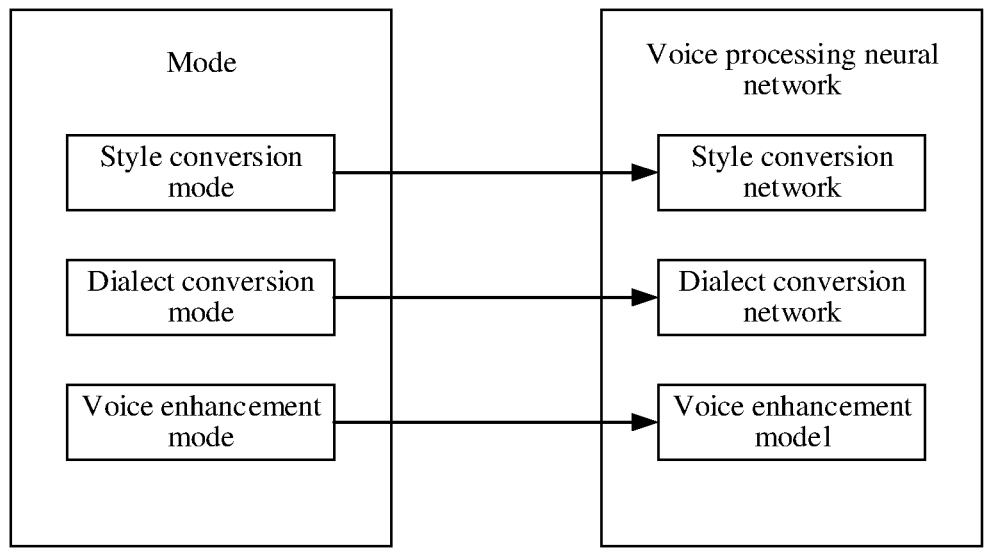
FIG. 3 is a schematic diagram of a correspondence between each mode and each voice conversion network according to an embodiment of the present disclosure.

Refer to FIG. 3. The style conversion mode corresponds to a style conversion network, the dialect conversion mode corresponds to a dialect conversion network, and the voice enhancement mode corresponds to a voice enhancement model. The terminal determines, based on a correspondence between a mode and a voice conversion network, the target voice conversion network corresponding to the target conversion mode. For example, when the user selects the style conversion mode, the target voice conversion network is the style conversion network. When the user selects the dialect conversion mode, the target voice conversion network is the dialect conversion network. When the user selects the voice enhancement mode, the target voice conversion network is the voice enhancement model.

Step 103: The terminal obtains a to-be-converted first voice.

In a first implementation, the terminal receives the first voice input by a first speaker.

The terminal device receives, by using a microphone, the first voice input by the first speaker. The terminal device receives a first operation input by the user (where the user and the first speaker may be the same person, or may be different persons), where the first operation is an operation of recording a voice. For example, the first operation may be a tap operation. The user taps a "Start recording" button on a screen of a mobile phone. After receiving the first operation, the mobile phone starts to record the voice input by the user. The voice is used as a voice (namely, the first voice) that the user expects to beautify (or process).

In a second implementation, the terminal selects the first voice from a local storage file.

The terminal device may obtain the first voice from the local storage file. The terminal device receives a second operation input by the user, where the second operation is an operation of selecting a voice file. For example, the user taps a "Select file" button on the screen of the mobile phone, and the mobile phone may display a to-be-selected voice list based on the second operation. Then, the terminal device receives a third operation input by the user, where the third operation is for selecting a target voice, and the terminal device uses the target voice as the first voice.

Step 104: The terminal extracts feature information of the first voice.

The feature information may be a mel-frequency cepstral coefficient (MFCC) feature. Alternatively, the feature information is a phoneme posteriorgram (PPG) feature. In this embodiment, an example in which the feature information of the first voice is the PPG feature is used for description. The PPG feature describes a probability of each phoneme in a phoneme set corresponding to a voice frame, and is equivalent to recognizing the phoneme. The PPG feature is for retaining content information of the first voice.

Step 105: The terminal inputs the feature information of the first voice into the target voice conversion network corresponding to the target conversion mode, and outputs, over the target voice conversion network, a second voice obtained through conversion.

In a first mode, the target voice conversion network is the style conversion network. For example, the terminal obtains a third voice for extracting a style feature, and then inputs the third voice into a style separation model, to separate the style feature of the third voice by using the style separation model. Finally, the style feature and the PPG feature of the first voice are input into a voice fusion model for fusion, to obtain the second voice.

In a second mode, the feature information of the first voice is input into the dialect conversion network, and the second voice is output over the dialect conversion network. The first voice is a voice of a first dialect, and the second voice is a voice of a second dialect.

In a third mode, the PPG feature of the first voice is input into a voice enhancement model corresponding to the mode, and the second voice is output by using the voice enhancement model, where the second voice is a near-field voice.

Human voice beautification includes the plurality of modes, and the plurality of modes include the style conversion mode, the dialect conversion mode, and the voice enhancement mode. The first voice may be beautified based on a mode selected by the user. For example, a style of the first voice is beautified, dialect conversion is performed on the first voice, or voice enhancement is performed on the first voice, to implement diversified human voice beautification.

Step 106: The terminal outputs the second voice.

The terminal outputs, by using a loudspeaker, the second voice obtained through conversion.

This embodiment provides the plurality of selectable modes, for example, the style conversion mode, for performing speaking style conversion on the first voice; the dialect conversion mode, for adding an accent or removing an accent; and the voice enhancement mode, for implementing voice enhancement. The three modes have corresponding voice conversion networks. The first voice can be converted over the voice conversion network corresponding to the mode based on a requirement of the user. Therefore, this implements diversified human voice beautification and satisfies requirements of the user in different application scenarios.

Figure 4:
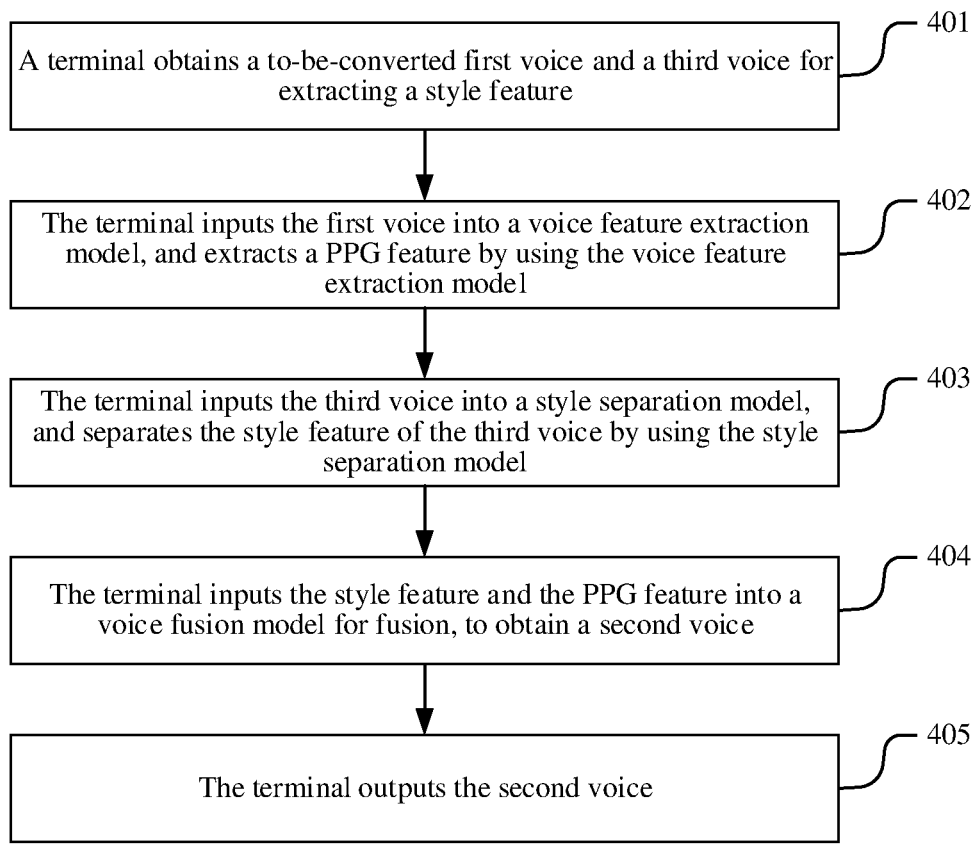
FIG. 4 is a flowchart of steps of another embodiment of a voice conversion method according to an embodiment of the present disclosure.

Refer to FIG. 4. An embodiment of the present disclosure provides another embodiment of voice conversion. In this embodiment, a style conversion mode is described, that is, an example of performing style conversion on a first voice is described. A mode is the style conversion mode, and a target voice conversion network is a style conversion network.

Step 401: A terminal obtains the to-be-converted first voice and a third voice for extracting a style feature.

For a method for obtaining the first voice by the terminal in this step, refer to the descriptions of step 103 in the embodiment corresponding to FIG. 1. Details are not described herein again.

Manners in which the terminal obtains the third voice are as follows:

In a first implementation, the terminal receives a template selection operation input by a user, and the terminal selects, based on the template selection operation, a voice corresponding to a target template, and then uses the voice corresponding to the target template as the third voice. For example, the target template includes but is not limited to "Male announcer", "Female announcer", "Actor voice", and the like.

Optionally, the target template may alternatively be a category. Further, the terminal device receives a sub-template selection operation, and the terminal device selects, based on the sub-template selection operation, a target voice corresponding to a sub-template. For example, a sub-template list in a "Male announcer" category includes "Announcer A", "Announcer B", "Announcer C", and the like. A sub-template list in a "Female announcer" category includes "Announcer D", "Announcer C", and the like. A sub-template list in an "Actor voice" category includes "Actor D", "Actor F", and the like. For example, if the user selects "Announcer A", the terminal device selects, based on the sub-template selection operation input by the user, a voice corresponding to "Announcer A" as the third voice. It should be noted that examples of the target template and the sub-template in this embodiment are examples for description, and do not constitute a limitation.

In a second implementation, the terminal may receive the third voice input by a second speaker. For example, the terminal device receives a template selection operation input by a user, where a target template selected by the template selection operation is "Voice of any person", and the terminal may use a voice corresponding to "Voice of any person" as the third voice. For example, the user taps a "Voice of any person" option, and the terminal starts to record the third voice, where the second speaker is any person different from a first speaker.

Optionally, the third voice may be a locally pre-stored recorded voice. For example, the third voice may be a voice of a favorite character in a movie (a voice of a cartoon character, or a voice of an actor). Optionally, the third voice may alternatively be a voice that is downloaded from the Internet in advance and stored in the terminal device.

Step 402: The terminal inputs the first voice into a voice feature extraction model, and extracts a PPG feature of the first voice by using the voice feature extraction model, where the PPG feature is for retaining content information of the first voice.

Figure 5:
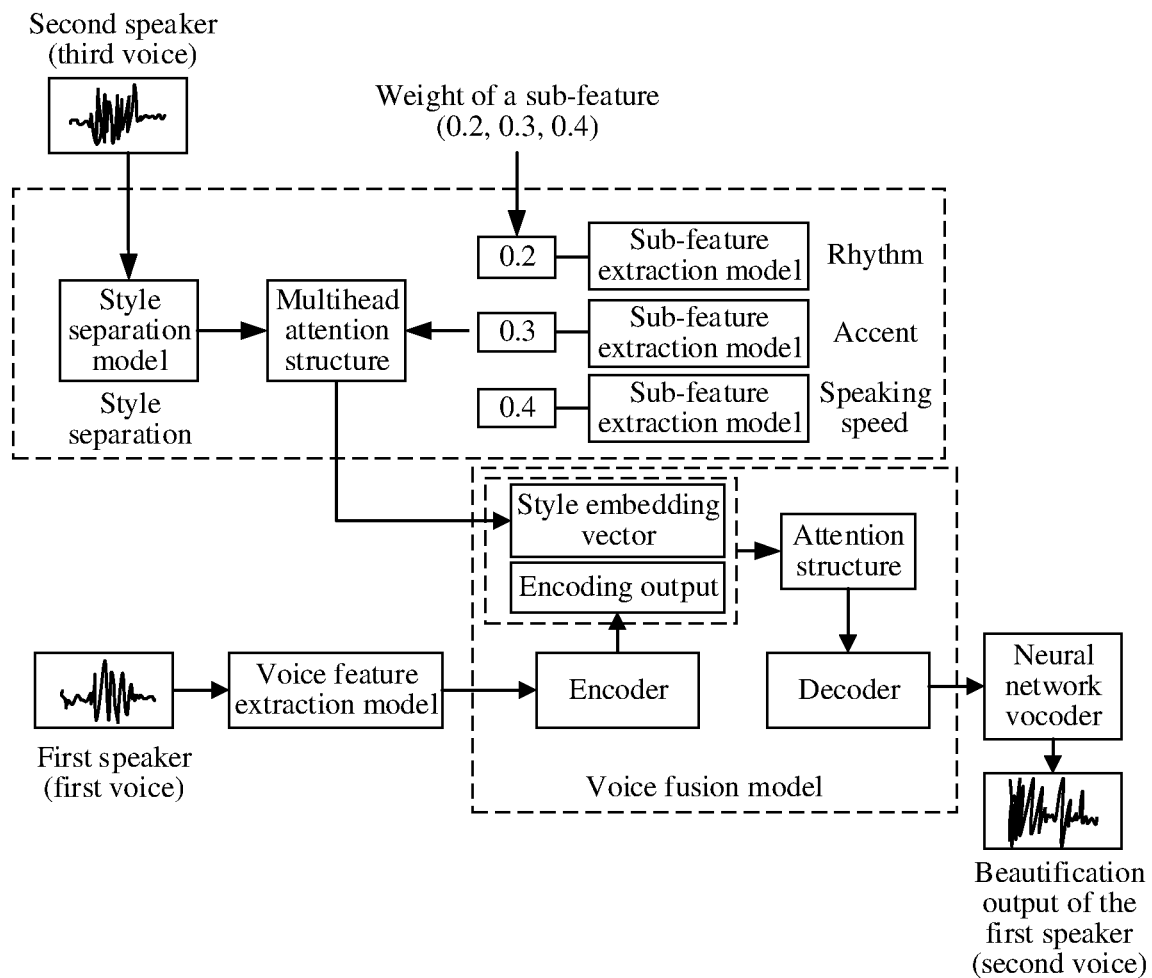
FIG. 5 is a schematic diagram of an example of a style conversion process of a voice according to an embodiment of the present disclosure.

Refer to FIG. 5. The terminal inputs the first voice into the voice feature extraction model, and extracts the PPG feature of the first voice by using the voice feature extraction model. For example, the voice feature extraction model may be a deep neural network. The voice feature extraction model includes a plurality of convolutional layers, two LSTM layers, and one fully connected layer. The voice feature extraction model outputs the PPG feature of the first voice. The PPG feature describes a probability of each phoneme in a phoneme set corresponding to a voice frame, and is equivalent to recognizing the phoneme. The PPG feature is for retaining the content information of the first voice. The voice feature extraction model is obtained by performing training in advance based on a large quantity of corpuses.

In this embodiment, the PPG feature is used as a content information input of the first voice, and these voice units (phonemes) retain a language and voice information of the voice. Compared with an automatic speech recognition (ASR) technology, use of the PPG feature can further improve robustness. In the ASR technology, a voice needs to be first converted into a text. This increases a probability of a voice content recognition error. In this embodiment, the PPG feature is used as the content information input of the first voice, that is, a voice can be directly input, and does not need to be converted into text content. This improves robustness of a system.

Step 403: The terminal inputs the third voice into a style separation model, and separates the style feature of the third voice by using the style separation model.

The style feature includes a first feature, and the first feature includes a plurality of sub-features. For example, the first feature is a timbre feature, and the plurality of sub-features include a prosody, an accent, a speaking speed, and the like.

A style separation model is for separating the style feature of the third voice. The style separation model includes a timbre separation model. The timbre separation model is for separating a timbre feature of the third voice, to obtain a vector (namely, a timbre feature vector) of the first feature.

Optionally, the style conversion network further includes a plurality of sub-feature extraction models and a multi-head attention structure. The terminal inputs the third voice into the sub-feature extraction model, and extracts a vector of the sub-feature by using the sub-feature extraction model. For example, the plurality of sub-feature extraction models include a prosody extraction model, an accent extraction model, and a speaking speed extraction model. For example, the prosody extraction model is for extracting a prosody feature of the third voice, to obtain a prosody vector. The accent extraction model is for extracting an accent feature of the third voice, to obtain an accent vector. The speaking speed extraction model is for extracting a speaking speed feature of the third voice, to obtain a speaking speed vector.

First, the terminal receives a weight of each of the plurality of sub-features input by a user. In an example, a screen of a mobile phone displays an adjustment bar for a prosody, a speaking speed, and an accent, and the user may input, by adjusting the adjustment bar for each sub-feature, a weight corresponding to each sub-feature. The weight corresponding to each sub-feature can be flexibly adjusted based on a requirement of the user. For example, if "Prosody" is set to 10%, it indicates that a final output voice is 10% similar to a prosody of a target template, that is, a parameter whose value is 0.1 is transferred to the built-in sub-feature extraction model.

In another example, several levels are preconfigured. For example, there may be three levels, and a weight of each sub-feature in each level is preconfigured based on an empirical value. For example, in a first level, a weight of a prosody is 0.1, a weight of a speaking speed is 0.2, and a weight of an accent is 0.1. In a second level, a weight of the prosody is 0.2, a weight of the speaking speed is 0.2, a weight of the accent is 0.1, and so on. The terminal determines, by receiving a level input by the user, the weight corresponding to each sub-feature. In this example, the user does not need to adjust the weight of each sub-feature separately, but only needs to select a level. This facilitates user operations.

Then, the terminal determines the style feature of the third voice based on the vector of the first feature, the vector of each sub-feature, and the weight of each sub-feature.

The terminal multiplies the weight that is input by the user and that corresponds to each sub-feature and the vector of each sub-feature. A result obtained through the multiplication and the vector (for example, a timbre vector) of the first feature are simultaneously input into a multi-head attention structure for attention alignment, so that the multi-head attention structure outputs a style vector, where the style vector is the style feature of the third voice. The multi-head attention structure enables a model to extract a feature expression from different subspaces. Each head corresponds to one sub-feature space in a high-dimensional space. This is equivalent to decomposing the high-dimensional space, and each head is responsible for one sub-feature space. A multi-head attention mechanism is equivalent to a plurality of attention mechanisms having a same structure, so that a result output by the multi-head attention mechanism includes some timbres of the third voice. For example, a structure output by the multi-head attention mechanism may be a 256-dimensional style embedding vector (a style feature).

In this embodiment, a similarity between styles of the to-be-converted voice and the third voice is adjusted by using the weight that corresponds to each sub-feature and that is input by the user, where the similarity is determined by the weight input by the user. The user may choose whether to input the weight. If the user chooses to input the weight, the similarity between the styles of the finally output voice and the third voice is determined by the input weight. If the user chooses not to input the weight, the style of the finally output voice is completely the same as the style (or a timbre, in which a style of the timbre is used as an example) of the third voice. The user may flexibly adjust the style of the to-be-converted voice by adjusting the input weight. The style of the to-be-converted voice may be completely the same as the style of the third voice, or may be changed based on the style of the third voice, to implement diversified styles of the to-be-converted voice. For example, the style of the to-be-converted voice may be a voice style of a "Male announcer", may be a voice style of a "Female announcer", or may be a style of a voice of any person, and may also change based on the voice styles of a "Male announcer", a "Female announcer" or any person, to implement diversified voice styles.

Step 404: The terminal inputs the style feature and the PPG feature into a voice fusion model for fusion, to obtain a second voice.

For example, the voice fusion model is a seq2seq neural network, and an attention mechanism is introduced into the seq2seq neural network. The seq2seq neural network includes an encoder, a decoder, and an attention structure. Models of the encoder and the decoder may use any combination of neural network models, for example, any one or a combination of any two of a convolutional neural network (CNN), a recurrent neural network (RNN), and a long short-term memory (LSTM) network. For example, in the present disclosure, the encoder may include three convolutional layers and one bidirectional LSTM layer. The PPG feature is first input into the encoder, and the encoder encodes an input PPG sequence into a vector of a fixed dimension. Because a length of the input sequence may be long, it is difficult for a vector to express abundant information during decoding. Therefore, the attention mechanism is introduced. Then, a vector of the style feature and a PPG vector output by the encoder are spliced in width, to obtain an attention input matrix. Then, the attention input matrix is sent to the attention structure frame by frame, and the attention structure cooperates with the encoder to output a mel (or may also be referred to as a mel spectrum) feature of the second voice. The mel spectrum feature is a feature representation form of the second voice. After encoding ends, different weighting is performed on an output vector of an encoding module to obtain several vectors, and each vector corresponds to one output. This ensures that an output sequence is focused on an input sequence instead of depending on all input sequences.

Step 405: The terminal outputs the second voice.

The mel spectrum feature is an intermediate representation. Although a mel spectrum contains information about an output voice, the mel spectrum cannot be directly played, and an inverse process of converting a voice signal into the mel spectrum needs to be performed. In the present disclosure, a playable audio file may be generated by using a vocoder by using an acoustic feature of the mel spectrum. The vocoder may be a neural network vocoder, and the network is responsible for converting the mel feature into a voice signal with a high natural degree. The network includes a plurality of convolutional layers and reverse convolutional layers, and a final output is a playable voice. Content in the voice is the same as that in the first voice, and a speaking style is the same as that in the third voice. The terminal may directly play the second voice. Optionally, the user may choose whether to retain the second voice. If the user chooses to retain the second voice, the terminal stores the second voice.

In this embodiment, the terminal receives the to-be-converted first voice and the third voice for extracting the style feature, then inputs the first voice into the voice feature extraction model, and extracts the PPG feature by using the voice feature extraction model. The PPG feature is for retaining the content information of the first voice, and a voice is directly input by using the PPG feature. The terminal inputs the third voice into the style separation model, separates the style feature of the third voice by using the style separation model, and finally inputs the style feature and the PPG feature into the voice fusion model for fusion, to obtain the second voice fusing the content of the first voice and the style of the third voice. The third voice may be a voice of any person, so that the first voice is converted into a voice style of any person, to implement diversified voice style conversion.

In an application scenario, a voice processing neural network in the present disclosure is equipped in an application. For example, the APP may be an instant messaging APP, or a human voice beautification APP. The human voice beautification APP may be applied to a voice recording or video recording scenario. For example, a user may beautify a to-be-sent voice by using the APP. In a voice recording and video recording scenario, after recording a voice or a video with a voice by using the terminal, the user may beautify the voice by using an APP described in the present invention.

Figure 6A:
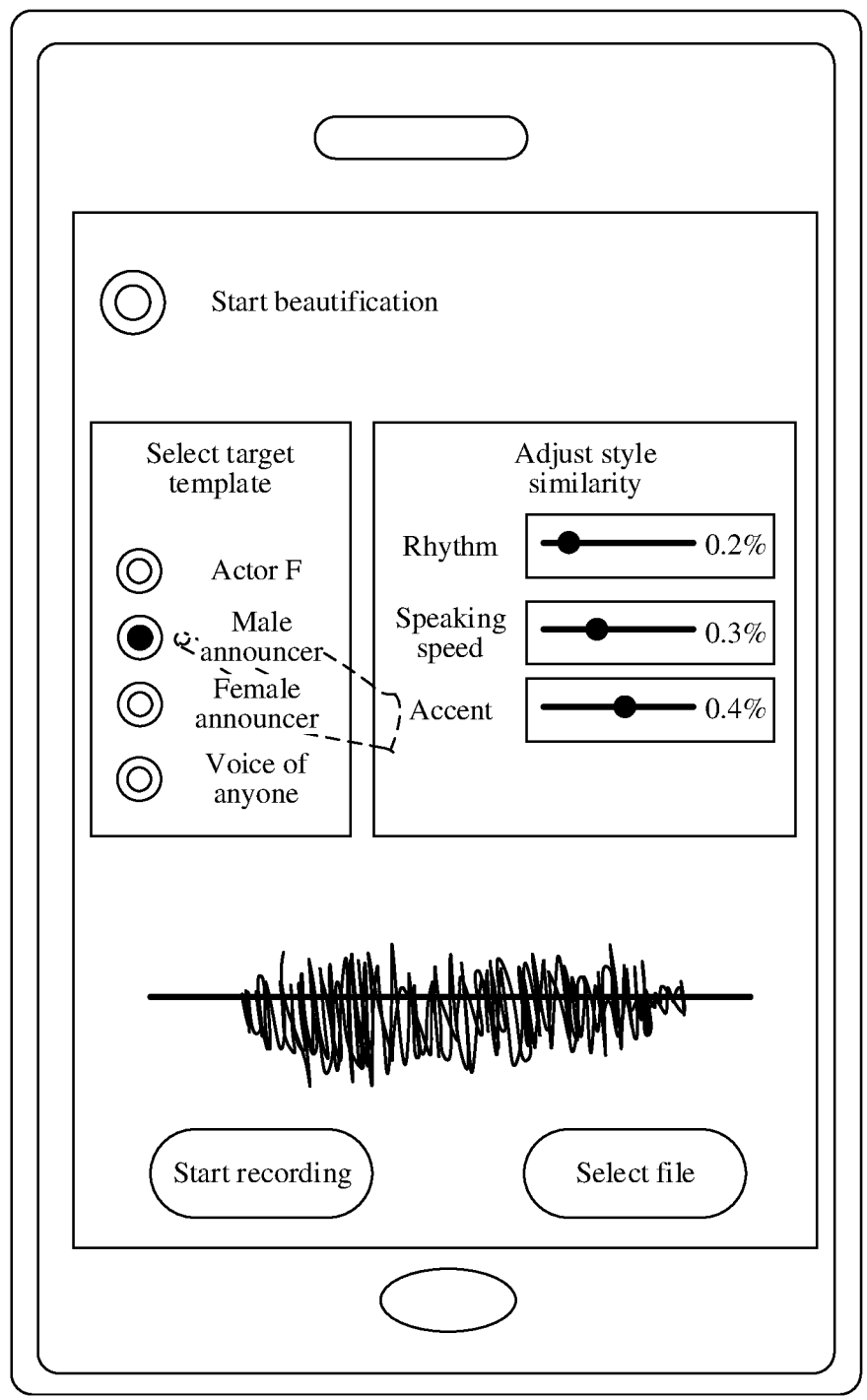
FIG. 6A is a schematic diagram of a scenario of an interface of a style conversion mode according to an embodiment of the present disclosure.
Figure 6B:
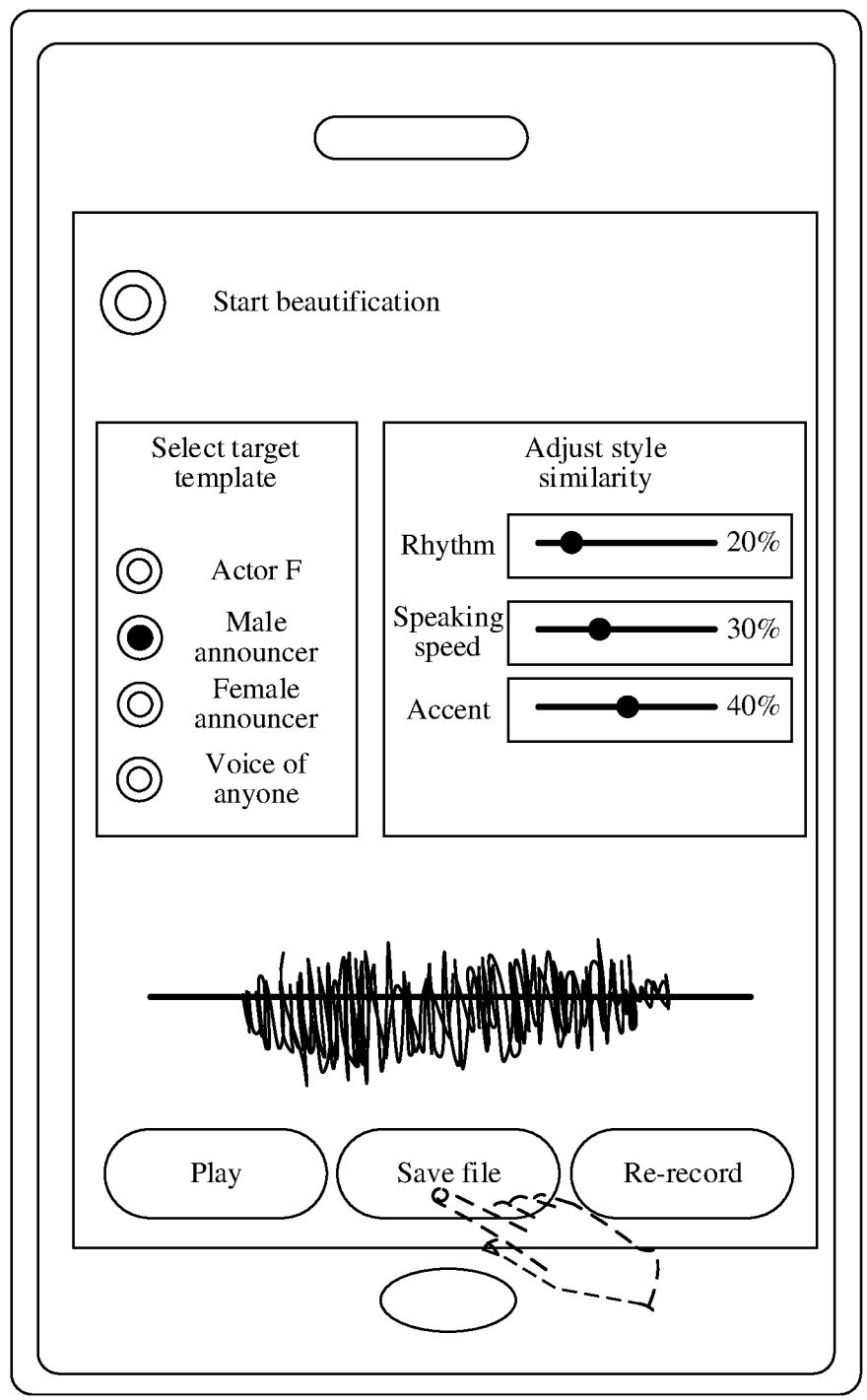
FIG. 6B is a schematic diagram of another scenario of an interface of a style conversion mode according to an embodiment of the present disclosure.

Refer to FIG. 6A and FIG. 6B. A method for beautifying a human voice by the user by using the APP may include the following steps.

1. After tapping a "Start recording" button on a screen, a user can record a voice (a first voice) that the user wants to process. Alternatively, the user may tap "Select file", and then select a voice from a local file as the first voice. In addition, the read first voice may be displayed by using an audio waveform.
2. The user selects a target template on an interface, that is, selects a third voice. When the user selects "Actor F", "Male announcer", or "Female announcer", a voice stored in a terminal is used by default. When the user selects "Voice of any person", the user needs to tap the "Start recording" or "Select file" button to input a voice of any person into the APP.

If the user taps the "Start recording" button, the terminal device starts to record the voice of any person, that is, receives the third voice input by a second speaker. If the user taps "Select file", the terminal device selects a stored voice of any person from the local file, and uses the voice as the third voice.

3. In "Adjust style similarity", the user can choose to input a style feature weight (which is also referred to as a "sub-feature weight"). For example, if "Prosody" is set to 20%, it indicates that a final output voice is 20% similar to a prosody of the target template, that is, the APP transfers a parameter whose value is 0.2 to a built-in neural network model. Similarly, if "Speaking speed" is set to 30%, it indicates that the final output voice is 30% similar to a speaking speed of the target template, and if "Accent" is set to 40%, it indicates that the final output voice is 40% similar to an accent of the target template. It should be noted that an adjustable style feature includes but is not limited to a pitch, an intensity, duration, a timbre, and the like. The timbre includes but is not limited to a rhythm, a speaking speed, and an accent.
4. After the user taps a "Start beautification" button, inputs of steps 1, 2, and 3 are simultaneously input into a trained built-in voice processing neural network of the APP. After being processed by the voice processing neural network, a segment of processed voice (a second voice) is output. Content of the voice is the same as content of the first voice, and a style of the voice is similar to that of the target template. A similarity is determined by the style feature weight used for input.
5. The user can view a processed voice waveform on the APP interface. In addition, three buttons "Play", "Save file", and "Re-record" are displayed. When the user taps "Play", the processed voice (the second voice) is played by using a loudspeaker of a mobile phone. When the user taps "Save file", the terminal locally saves the processed voice (the second voice). When the user taps "Re-record", the terminal starts re-processing, that is, the process goes back to step 4.

The foregoing describes a style conversion network and an application scenario. The following describes training and update processes of the style conversion network.

The style conversion network is a neural network including three parts: a voice feature extraction part (namely, a voice feature extraction model), a style separation part (that is, including a style separation model, a multi-head attention structure, and a plurality of sub-feature extraction models), and a voice fusion model.

Figure 7:
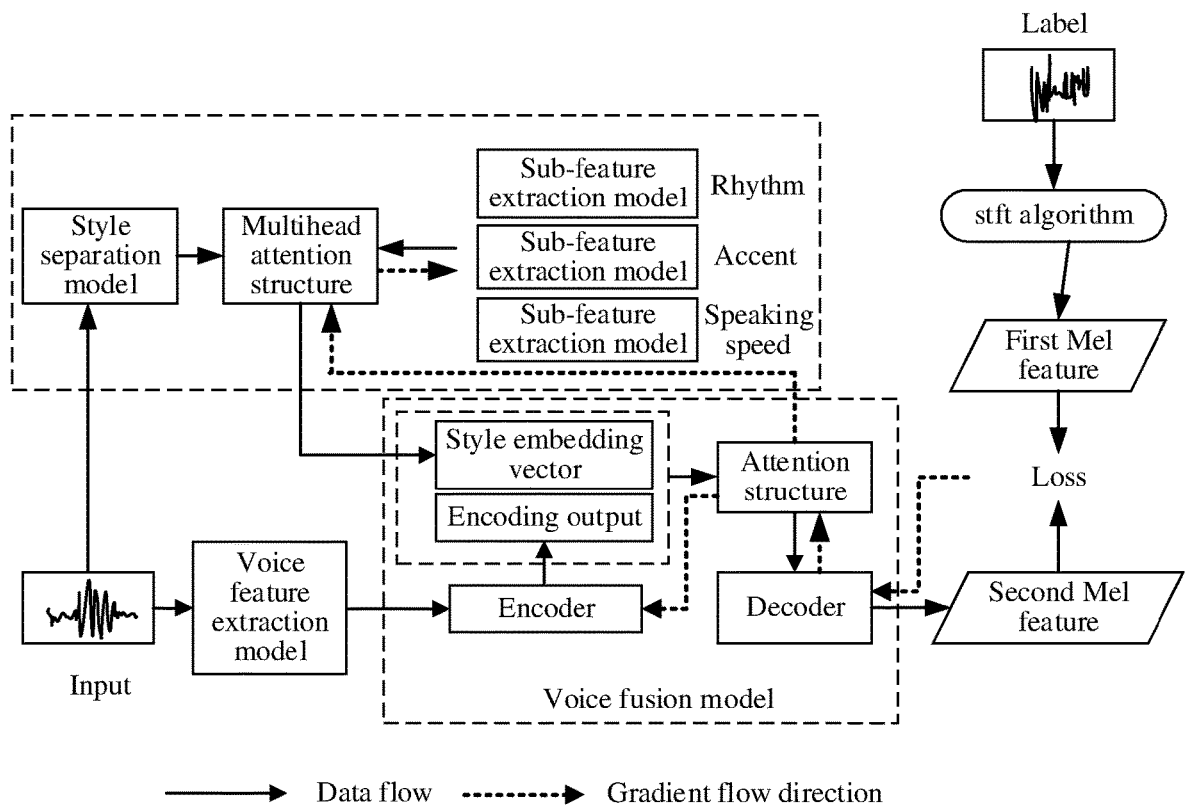
FIG. 7 is a schematic diagram of training and updating a style conversion network according to an embodiment of the present disclosure.

Refer to FIG. 7. In FIG. 7, a black solid line represents a flow direction of input data, and a black dashed line represents a parameter update direction. In the style conversion network, the style separation model and the voice feature extraction model do not participate in a network update.

The style separation model is trained in advance by using a large amount of voice data of different speakers. To be specific, a training dataset of the style separation model includes a large quantity of corpuses of different speakers (where voices of different speakers have different timbre features), and the style separation model is trained by using the training set, to obtain the style separation model. The style separation model does not participate in a parameter update of an entire network.

The voice feature extraction model is trained in advance by using a large quantity of corpuses. For example, an input of sample data included in a training dataset is a voice, and a label is a PPG feature of the input voice. The voice feature extraction model is for extracting the PPG feature, and the voice feature extraction model does not participate in the parameter update of the entire network.

In addition to the style separation model and the voice feature extraction model in the entire network, another model participates in training and update of the entire network.

Refer to a model passed through by the black dashed line in FIG. 7. In a multi-head attention structure, each sub-feature extraction model, and a seq2seq neural network (including an encoder, a decoder, and an attention structure), each structure may be a neural network, and each neural network may include structure layers such as a plurality of convolutional layers, fully connected layers, and LSTM layers. However, a weight parameter of each layer needs to be obtained through a large amount of data training.

A difference between updating the style conversion network in the present disclosure and a conventional method lies in that: In the present disclosure, the style separation model and the voice feature extraction model are already trained in advance, and do not participate in a network update, that is, training of the style separation model does not need to be considered. Therefore, an input and a label do not need to be two voices (two voices spoken by two different people) with same content. This greatly reduces an amount of sample data. The label obtains a first melt feature by using a short-time fourier transform (STFT) algorithm. After a voice is input into the style conversion network, the network outputs a second melt feature. A loss value and a gradient are obtained by comparing the first melt feature and the second melt feature. The melt features are obtained by using the STFT algorithm based on the output and input of the network and the melt features are compared to obtain the loss value and the gradient. The black dashed line in FIG. 7 is a gradient flow direction, a parameter in a structure is updated only when the gradient flows through the corresponding structure. The style separation model and the voice feature extraction model are obtained through training in advance, and do not need to participate in a parameter update of the network. The loss value is an indicator for determining when the network stops training. When the loss value decreases to a specific value and does not show a continued significant decrease trend, it indicates that the network has converged and the training can be stopped.

The entire style conversion network does not use a style label (that is, the input and the label are in the same voice sequence) to obtain a voice beautification capability. This network learning mode belongs to an unsupervised learning mode. The style conversion network trained in the unsupervised learning mode can support the user in manually adjusting a beautification degree of the recorded voice and combining speaking styles of different speakers.

Figure 8:
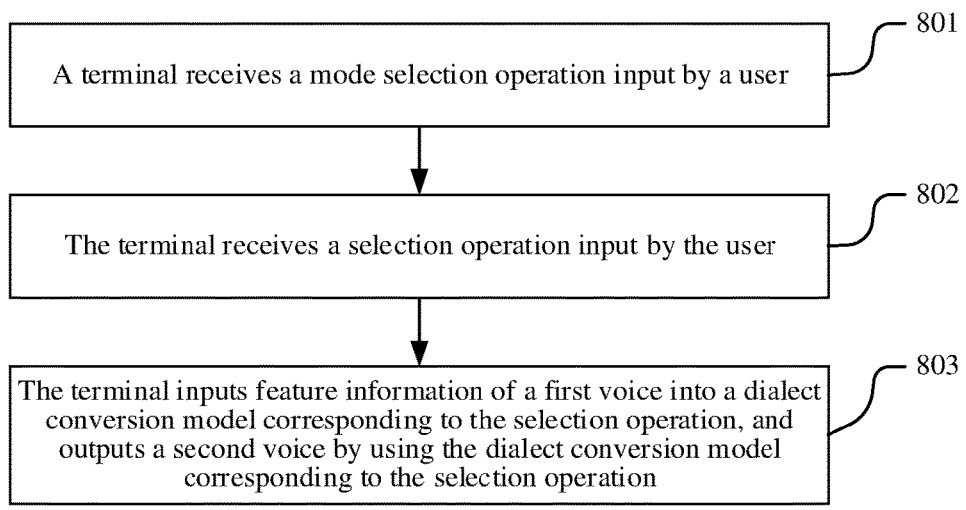
FIG. 8 is a flowchart of steps of another embodiment of a voice conversion method according to an embodiment of the present disclosure.

Refer to FIG. 8. An embodiment of the present disclosure provides another embodiment of voice conversion. In this embodiment, a dialect conversion mode and a voice enhancement mode are described.

A dialect conversion network includes a plurality of dialect conversion models, where the dialect conversion model is for performing dialect conversion on an input first voice. A voice enhancement model is for converting a far-field voice into a near-field voice to implement voice enhancement.

The plurality of dialect conversion models include at least two types of dialect conversion models. A first type is removing an accent, that is, converting a dialect into Mandarin. For example, Sichuanese is converted into Mandarin. A second type is adding an accent, that is, converting Mandarin into a dialect. For example, Mandarin is converted into Sichuanese. Each dialect conversion model is for a different dialect to be converted. Dialect conversion can enhance convenience of communication between users in different regions and implement diversified voice conversion. It should be noted that only two types of models are used as examples for description herein. Certainly, in an optional solution, the two dialect conversion models may also be jointly used, to perform conversion between the two dialects. For example, Sichuanese is converted into Cantonese. Sichuanese can be converted into Mandarin first, and then Mandarin is converted into Cantonese.

Step 801: A terminal receives a mode selection operation input by a user.

For example, different voice processing modes are displayed in a user interface of the terminal. For example, the processing modes may include "Switch dialect mode" and "Enhance voice mode". The model selection operation may be a tap operation. When the user taps "Switch dialect mode", the user selects a dialect switching processing mode.

Step 802: The terminal receives a selection operation input by the user.

Optionally, when the mode selection operation is for selecting a dialect switching mode, the mode selection operation (a level-1 operation) may further include a plurality of selection operations at a next level (a level-2 operation), for example, a first selection operation and a second selection operation. The first selection operation is for selecting "Remove accent", and the second selection operation is for selecting "Add accent". Each level-2 operation includes a plurality of level-3 operations. In an application scenario, when the user selects "Switch accent dialect", a level-2 category "Remove accent" and "Add accent" options are displayed. When the user selects "Add accent", the user interface of the terminal displays a level-3 category label of accent options of different places, for example, "Sichuan accent" and "Guangdong accent". The terminal receives a level-3 selection operation input by the user, for example, a first operation or a second operation. The first operation is for choosing to convert Sichuanese to Mandarin, and the second operation is for choosing to convert Mandarin to Sichuanese, and the like. The terminal may select a corresponding dialect conversion model based on a specific operation input by the user.

Step 803: The terminal inputs feature information of a first voice into a dialect conversion model corresponding to the selection operation, and outputs a second voice by using the dialect conversion model corresponding to the selection operation.

Figure 9:
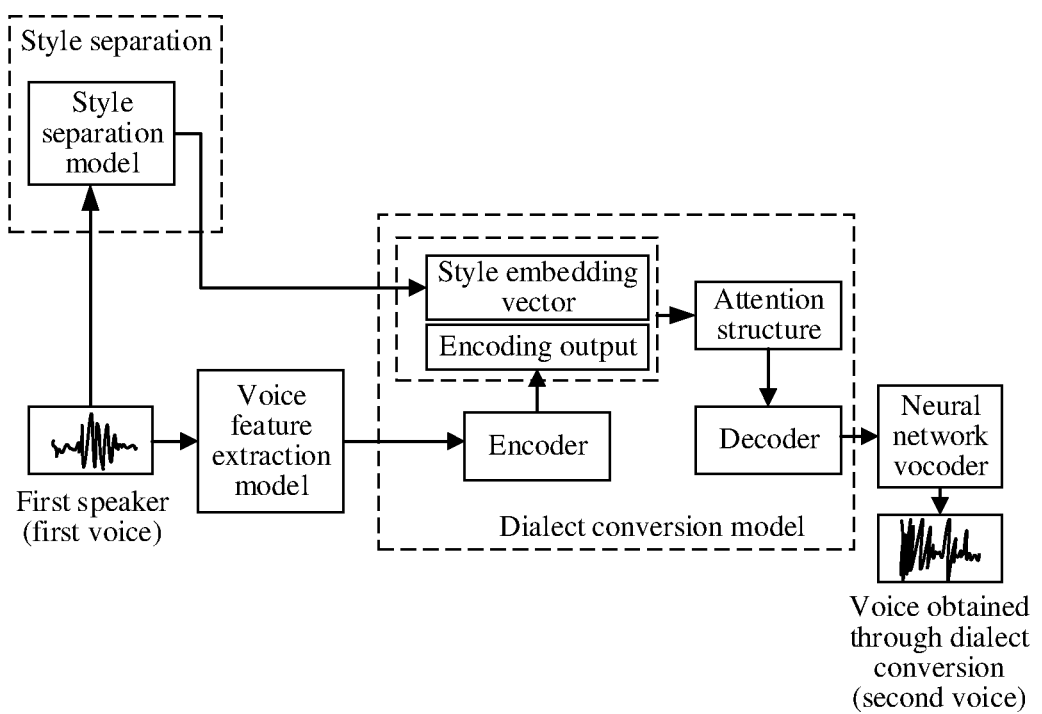
FIG. 9 is a schematic diagram of an example of a dialect conversion process of a voice according to an embodiment of the present disclosure.

Refer to FIG. 9. When the mode selection operation is for selecting the dialect switching mode, the terminal inputs a PPG feature into a dialect switching model (a seq2seq neural network) based on the mode selection operation, and outputs a melt feature form of the second voice by using the dialect switching model. Then, a melt feature is converted into a playable voice form by using a neural network vocoder. The first voice is a voice of a first dialect, and the second voice is a voice of a second dialect.

Optionally, the terminal inputs a third voice into a style separation model, and separates a style feature of the first voice by using the style separation model, to obtain a timbre feature vector of the first voice. Then, the PPG feature of the first voice and the timbre feature vector of the first voice are input into the dialect conversion model corresponding to the selection operation, and the second voice is output by using the dialect conversion model corresponding to the selection operation. Content of the second voice is the same as content of the input voice (the first voice), and a speaking style of the input voice (the first voice) is retained.

It should be noted that, in this embodiment, a dialect is a "local language", for example, Sichuanese or Cantonese. Mandarin is also a type of dialect. In Chinese, Mandarin uses a Beijing voice as a standard voice, and may be understood as a dialect based on a northern dialect. In other words, in the present disclosure, Mandarin is also a type of dialect.

For example, the first dialect is Sichuanese, and the second dialect is Mandarin.

Alternatively, the first dialect is Mandarin, the second dialect is Sichuanese, or the second dialect is a northeast dialect. Specifically, the first dialect and the second dialect are not limited.

Figure 10:
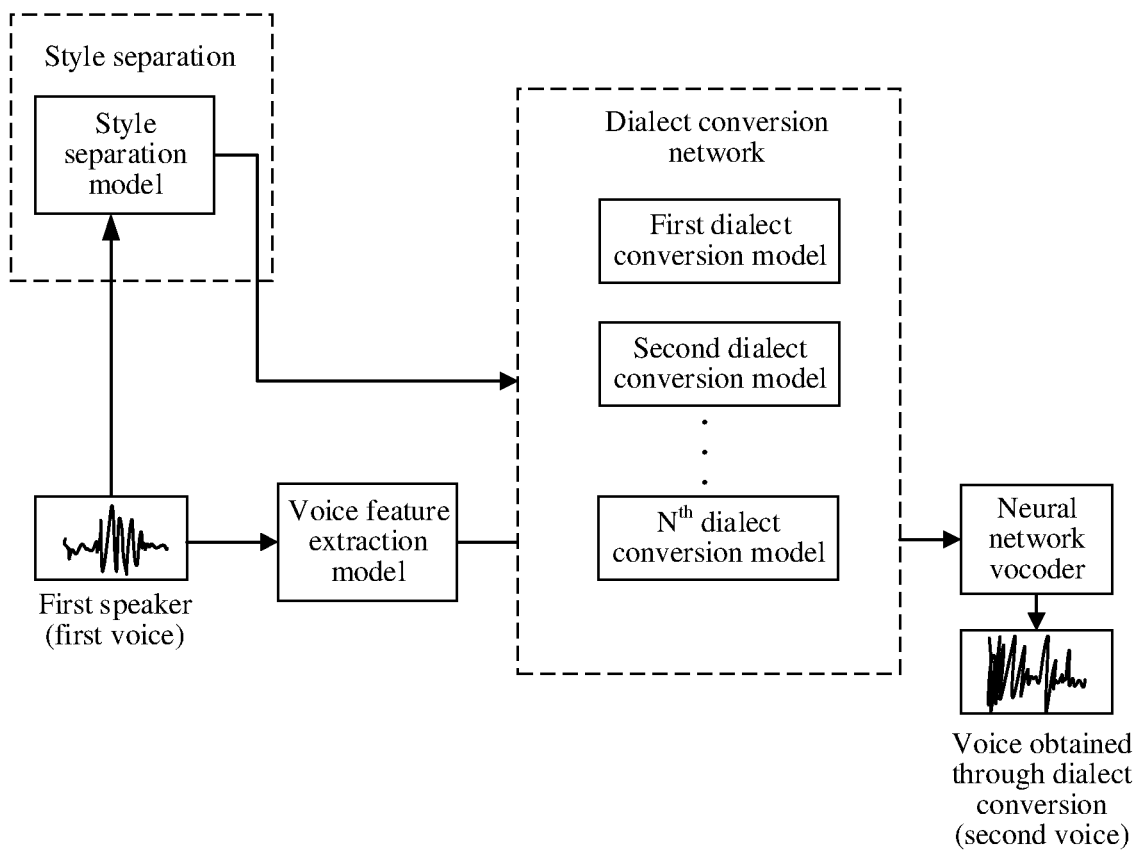
FIG. 10 is a schematic diagram of another example of a dialect conversion process of a voice according to an embodiment of the present disclosure.

Refer to FIG. 10. A dialect conversion network includes N dialect conversion models, each dialect conversion model is for a different dialect to be converted, and each dialect conversion has a corresponding model. For example, a first dialect conversion model among a plurality of dialect conversion models is for converting Sichuanese into Mandarin, and a second dialect conversion model is for converting Mandarin into Cantonese, and an integration model of the first dialect conversion model and the second dialect conversion model can convert Sichuanese into Cantonese. In this example, a first dialect and a second dialect are described by using examples, and this does not constitute a limitation on the present disclosure.

Optionally, when a mode corresponding to a mode selection operation is a voice enhancement mode, a terminal inputs a PPG feature of a first voice into a voice enhancement model corresponding to the mode, and outputs a second voice by using the voice enhancement model, where the first voice is a far-field voice, and the second voice is a near-field voice. The far-field voice is converted into the near-field voice. This implements voice enhancement, increases application scenarios, and implements diversified voice conversion. The voice enhancement model is obtained by learning sample data in a training dataset. The sample data includes an input and a label. The input is a far-field voice, and the label is a near-field voice.

Optionally, the first voice is input into a style separation model, and a style feature of the first voice is separated by using the style separation model. Then, the style feature of the first voice and feature information of the first voice are input into the voice enhancement model, and the second voice is output by using the voice enhancement model, where a style of the second voice is the same as that of the first voice. In this example, the voice obtained through conversion is the same as the input voice (the first voice), and a speaking style of the input voice (the first voice) is retained.

Figure 11A:
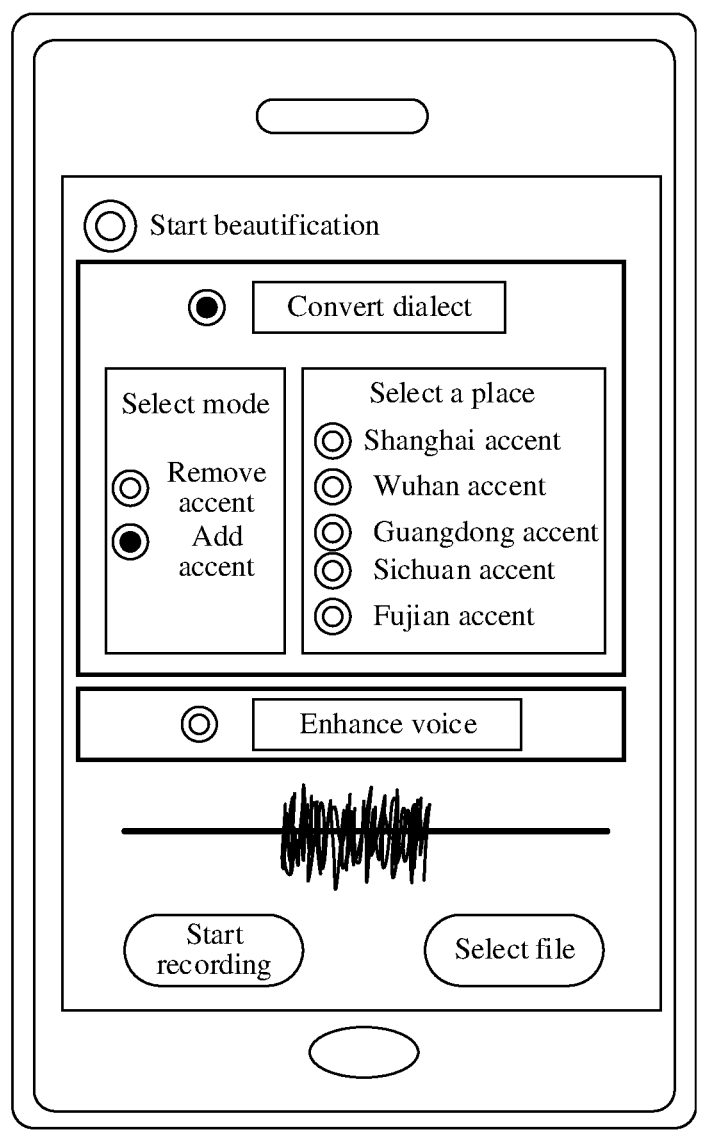
FIG. 11A is a schematic diagram of a scenario of an interface of a dialect conversion mode and a voice enhancement mode according to an embodiment of the present disclosure.
Figure 11B:
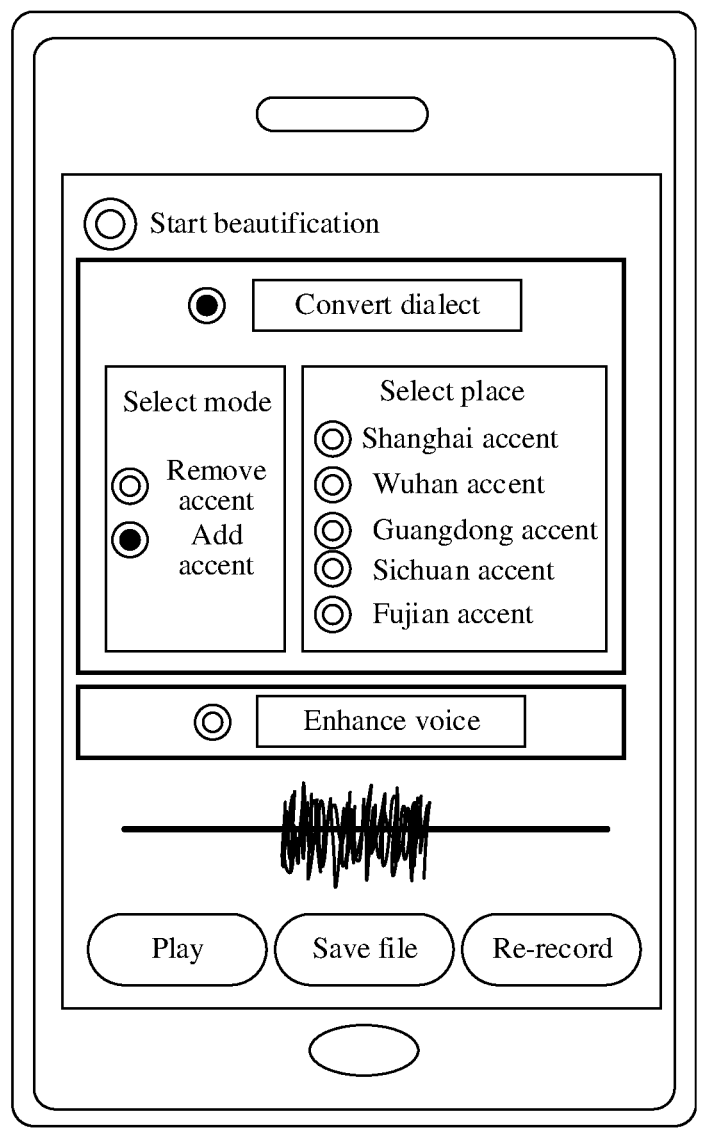
FIG. 11B is a schematic diagram of another scenario of an interface of a dialect conversion mode and a voice enhancement mode according to an embodiment of the present disclosure.

For example, in an application scenario, refer to FIG. 11A and FIG. 11B.
  a. After a user taps a "Start recording" button, the terminal records a voice (the first voice) that the user expects to process. The user may also tap a "Select file" button, and the terminal selects a segment of voice from a local file as the first voice. Optionally, the terminal may display a waveform of a read audio.
  b. The user selects a voice processing mode on an interface. A level-1 category label is displayed in the interface. For example, the level-1 category label includes "Switch dialect" and "Enhance voice". When the user selects "Switch dialect", a level-2 category label is displayed in the interface. For example, the level-2 category label includes "Remove accent" and "Add accent". When the user selects "Add accent", the interface displays a level-3 category label of accent options of different places, for example, "Guangdong accent", "Sichuan accent", and "Fujian accent". Alternatively, the user may select an "Enhance voice" mode.
  c. The terminal selects a corresponding model based on the mode selected by the user.
  d. After the user taps a "Start beautification" button, the first voice is input into a selected model (for example, a dialect conversion model for converting Mandarin into a Guangdong accent). The dialect conversion model processes the first voice for a period of time, and outputs a second voice obtained after processing. Content of the second voice is the same as content of the input voice (the first voice), and a speaking style of the input voice (the first voice) is retained. Alternatively, the first voice is input into the selected voice enhancement model. The voice enhancement model processes the first voice for a period of time, and outputs a second voice obtained after processing. Content of the second voice is the same as content of the input voice (the first voice), and a speaking style of the input voice (the first voice) is retained. The first voice is a far-field voice, and the second voice is a near-field voice.
  e. Finally, the user can view a processed voice waveform on the display interface. Three buttons "Play", "Save file", and "Re-record" are also displayed in the display interface. When the user taps the "Play!" button, the processed voice is played by using a loudspeaker of a mobile phone. When the user taps the "Save file" button, the terminal locally saves the processed voice. When the user taps the "Re-record" button, the terminal processes the first voice again, selects a corresponding model based on a selection operation of the user on the interface at the moment, and returns to step d.

The following describes training and update processes of the dialect conversion model.

Figure 12:
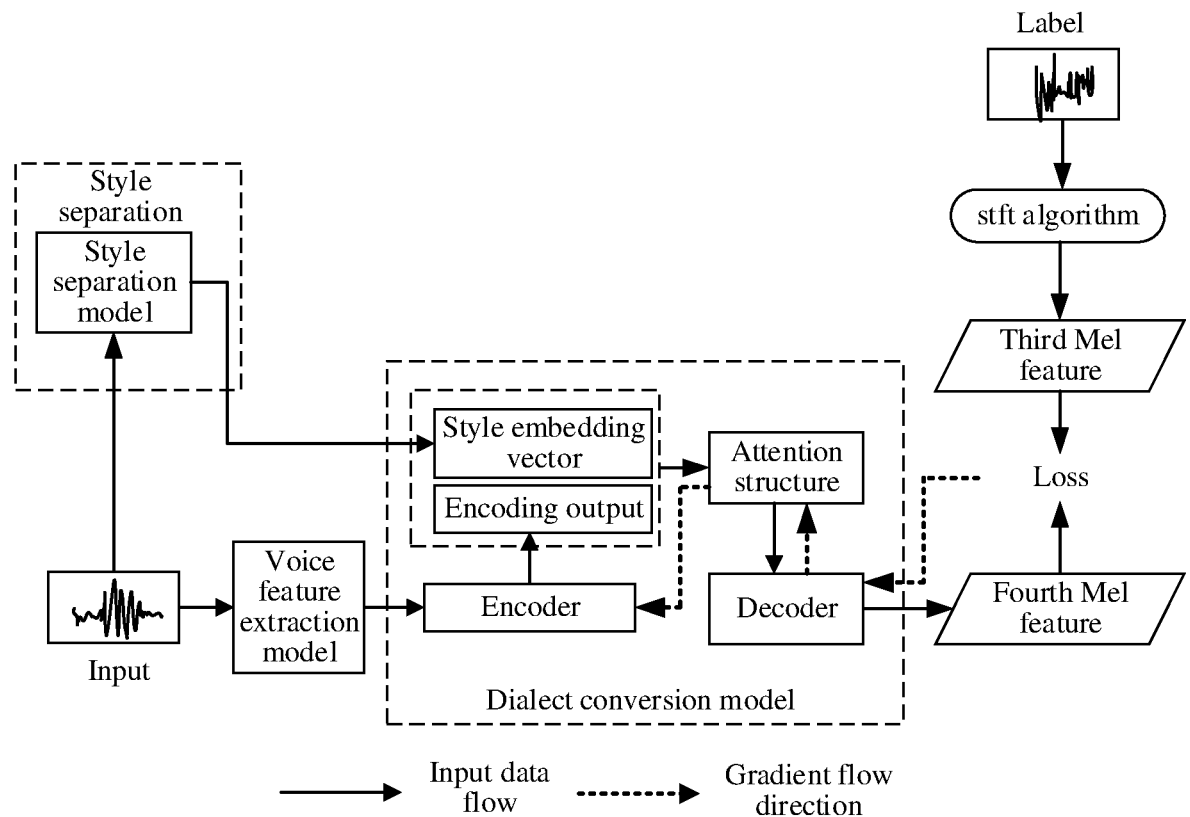
FIG. 12 is a schematic diagram of training and updating a dialect conversion model according to an embodiment of the present disclosure.

Refer to FIG. 12. Structures of all dialect conversion models are the same, and each dialect conversion model is a seq2seq neural network. The seq2seq neural network includes an encoder, a decoder, and an attention structure. Different dialect conversion models correspond to different training datasets, and parameters at different layers are different. For example, a first dialect conversion model is converting Sichuanese into Mandarin, and each piece of sample data in a training dataset corresponding to the first dialect conversion model includes an input and a label. The input is Sichuanese, and the label is Mandarin with the same content as Sichuanese. The second dialect conversion model is converting Mandarin into Sichuanese. Each piece of sample data in a training dataset corresponding to the second dialect conversion model includes an input and a label. The input is Mandarin, the label is Sichuanese with the same content as Mandarin, and the like. Different dialect conversion models learn different training datasets. In FIG. 12, a parameter update of each module in a dialect conversion model is used as an example.

A training manner of this training solution is basically the same as that of a style conversion network. A style separation model and a voice feature extraction model are already trained in advance, and do not participate in a network update, that is, training of the style separation model and the voice feature extraction model does not need to be considered. Therefore, a label obtains a third melt feature by using an STFT algorithm, and the network outputs a fourth melt feature. A loss value and a gradient are obtained by comparing the third melt feature and the fourth melt feature. The fourth melt feature output by the network is compared with the third melt feature obtained by using the input by using the STFT algorithm, to obtain the loss value and the gradient. In FIG. 12, a black dashed line indicates a gradient flow direction. When the gradient flows through a corresponding structure (for example, an encoder, an attention structure, and a decoder), the parameter in the module is updated. The style separation model and the voice feature extraction model are obtained through training in advance, and do not need to participate in a parameter update of the network. The loss value is an indicator for determining when the network stops training. When the loss value decreases to a specific value and does not show a continued significant decrease trend, it indicates that the network has converged and the training can be stopped.

In this embodiment, style features such as a timbre, a rhythm, and a speaking speed in a voice are extracted in an unsupervised learning manner, to implement controllable beautification of a voice style. For a human voice beautification scenario in which a user expects that a style of a processed voice is the same as a style of a voice before processing, for example, an application scenario of dialect conversion and voice enhancement, in the present disclosure, the style of the processed voice can remain unchanged, and dialect conversion or voice enhancement can be implemented. In the present disclosure, an artificial intelligence technology is used to provide a more convenient and abundant method for implementing human voice beautification, and this method can cover more scenarios. Effects of removing an accent, adding an accent, or voice enhancement of any person can be achieved, and input and output voice styles can be unchanged.

In this embodiment, training and update of each model may be performed by a server. After the server trains a voice processing neural network, the terminal downloads the voice processing neural network to a local end. In actual application, the voice processing neural network is equipped in an APP. For example, the APP is an instant messaging APP.

Figure 13:
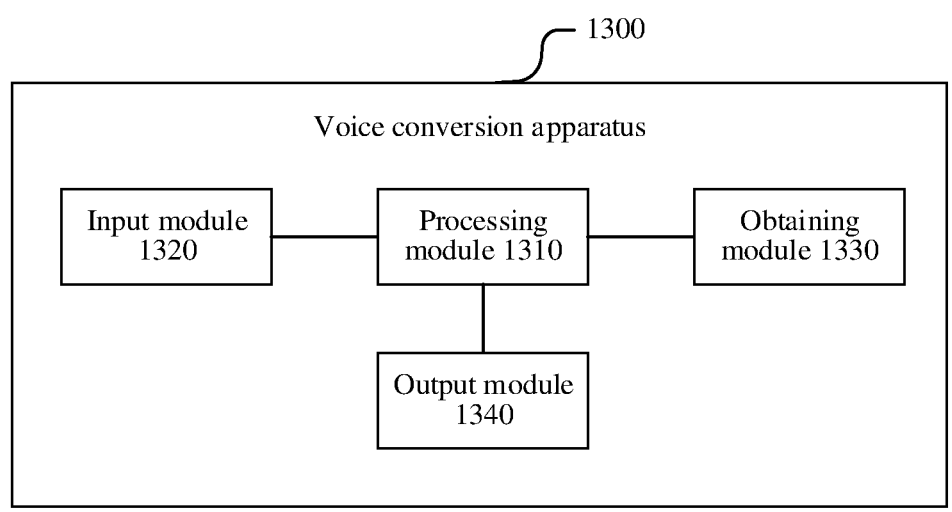
FIG. 13 is a schematic diagram of a structure of an embodiment of a voice conversion apparatus according to an embodiment of the present disclosure.

The foregoing describes a voice conversion method. Refer to FIG. 13. The following describes a voice conversion apparatus 1300 to which the method is applied. The voice conversion apparatus includes an input module 1320, a processing module 1310, an obtaining module 1330, and an output module 1340.

An input module 1320 is configured to receive a mode selection operation input by a user, where the mode selection operation is for selecting a voice conversion mode.

A processing module 1310 is configured to select a target conversion mode from a plurality of modes based on the mode selection operation received by the input module 1320, where the plurality of modes includes a style conversion mode, a dialect conversion mode, and a voice enhancement mode.

An obtaining module 1330 is configured to obtain a to-be-converted first voice.

The processing module 1310 is further configured to: extract feature information of the first voice obtained by the obtaining module 1330; input the feature information of the first voice into a target voice conversion network corresponding to the target conversion mode, and output, over the target voice conversion network, a second voice obtained through conversion.

An output module 1340 is configured to output the second voice.

In an optional implementation, the processing module 1310 is further configured to input the feature information of the first voice into a voice feature extraction model, and extract a phoneme posteriorgram (PPG) feature of the first voice by using the voice feature extraction model, where the PPG feature is for retaining content information of the first voice.

In an optional implementation, when the target conversion mode is the style conversion mode, the target voice conversion network is a style conversion network, and the style conversion network includes a style separation model and a voice fusion model.

The obtaining module 1330 is configured to obtain a third voice for extracting a style feature.

The processing module 1310 is further configured to input the third voice into the style separation model, and separate the style feature of the third voice by using the style separation model.

The processing module 1310 is further configured to input the style feature and the feature information of the first voice into the voice fusion model for fusion, to obtain the second voice.

In an optional implementation, the style feature includes a first feature, and the first feature includes a plurality of sub-features.

The processing module 1310 is further configured to: input the third voice into the style separation model, and extract a vector of the first feature of the third voice by using the style separation model; and input the third voice into a sub-feature extraction model, and extract a vector of the sub-feature by using the sub-feature extraction model.

The input module 1320 is further configured to receive a weight of each of the plurality of sub-features that is input by the user.

The processing module 1310 is further configured to determine the style feature of the third voice based on the vector of the first feature, the vector of the sub-feature received by the input module 1320, and the weight of the sub-feature received by the input module 1320.

In an optional implementation, the processing module 1310 is further configured to input the vector of the first feature into a multi-head attention structure, input the vector of the sub-feature and a product of the vector of the sub-feature and the weight corresponding to the sub-feature into the multi-head attention structure, and output the style feature of the third voice by using the multi-head attention structure.

In an optional implementation, the obtaining module 1330 is further configured to: receive a template selection operation input by the user, where the template selection operation is for selecting a target template; and obtain a voice corresponding to the target template, and use the voice corresponding to the target template as the third voice.

In an optional implementation, the obtaining module 1330 is further configured to receive the third voice input by a second speaker, where the first voice is a voice of a first speaker, and the second speaker is any person different from the first speaker.

In an optional implementation, the target conversion mode is the dialect conversion mode, and the target voice conversion network is a dialect conversion network. The processing module 1310 is further configured to input the feature information of the first voice into the dialect conversion network, and output the second voice over the dialect conversion network, where the first voice is a voice of a first dialect, and the second voice is a voice of a second dialect.

In an optional implementation, the dialect conversion network includes a plurality of dialect conversion models, and each dialect conversion model is for a different dialect to be converted.

The input module 1320 is further configured to receive a selection operation input by the user.

The processing module 1310 is further configured to input the feature information of the first voice into a dialect conversion model corresponding to the selection operation, and output the second voice by using the dialect conversion model corresponding to the selection operation.

In an optional implementation, the processing module 1310 is further configured to input the first voice into a style separation model, and separate a style feature of the first voice by using the style separation model.

The processing module 1310 is further configured to input the style feature of the first voice and the feature information of the first voice into the dialect conversion network, and output the second voice over the dialect conversion network, where a style of the second voice is the same as that of the first voice.

In an optional implementation, the first voice is a far-field voice, and when the target conversion mode is the voice enhancement mode, and the target voice conversion network is a voice enhancement model, the processing module 1310 is further configured to input the feature information of the first voice into a voice enhancement model corresponding to the mode, and output the second voice by using the voice enhancement model, where the second voice is a near-field voice.

In an optional implementation, the processing module 1310 is further configured to input the first voice into a style separation model, and separate a style feature of the first voice by using the style separation model.

The processing module 1310 is further configured to input the style feature of the first voice and the feature information of the first voice into a voice enhancement model, and output the second voice by using the voice enhancement model, where a style of the second voice is the same as that of the first voice.

In an optional implementation, the obtaining module 1330 is further configured to: receive the first voice input by the first speaker; or select the first voice from a local storage file.

In a possible design, the processing module 1310 may be a processing apparatus, and some or all functions of the processing apparatus may be implemented by using software.

Optionally, some or all functions of the processing apparatus may be implemented by using software. In this case, the processing apparatus may include a memory and a processor. The memory is configured to store a computer program, and the processor reads and executes the computer program stored in the memory, to perform corresponding processing and/or steps in any method embodiment.

Optionally, the processing apparatus may only include the processor. The memory configured to store the computer program is located outside the processing apparatus, and the processor is connected to the memory through a circuit/wire, to read and execute the computer program stored in the memory.

Optionally, the processing apparatus may be one or more chips, or one or more integrated circuits.

Figure 14:
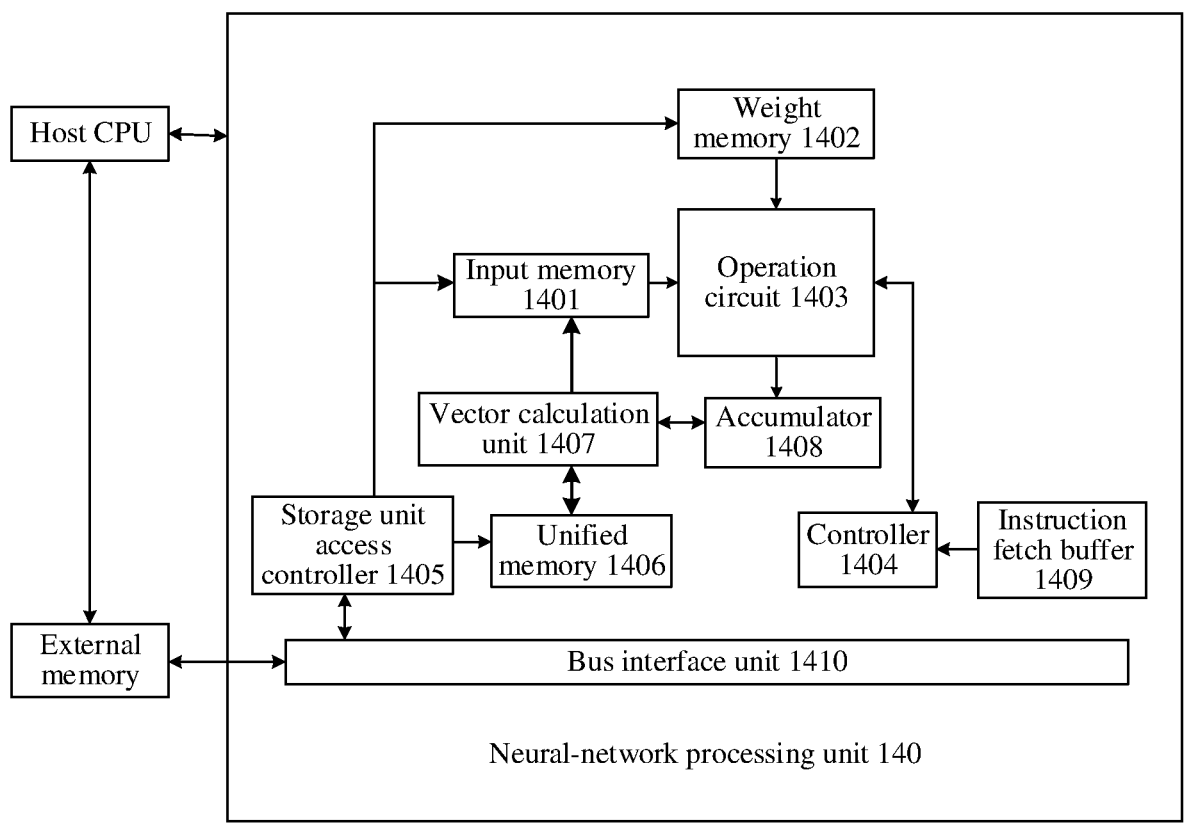
FIG. 14 is a schematic diagram of a structure of an example of a chip according to an embodiment of the present disclosure.

For example, an embodiment of the present disclosure provides a chip structure. Refer to FIG. 14. The chip includes:

The chip may be represented as a neural-network processing unit 140 (NPU). The NPU is mounted to a host CPU as a coprocessor, and the host CPU allocates a task. A core part of the NPU is an operation circuit 1403. The operation circuit 1403 is controlled by a controller 1404 to extract matrix data in a memory and perform a multiplication operation.

In some implementations, the operation circuit 1403 internally includes a plurality of processing units (PE). In some implementations, the operation circuit 1403 is a two-dimensional systolic array. The operation circuit 1403 may alternatively be a one-dimensional systolic array or another electronic circuit capable of performing mathematical operations such as multiplication and addition. In some implementations, the operation circuit 1403 is a general-purpose matrix processor.

For example, it is assumed that there are an input matrix A, a weight matrix B, and an output matrix C. The operation circuit fetches, from a weight memory 1402, data corresponding to the matrix B, and buffers the data on each PE in the operation circuit. The operation circuit obtains data of the matrix A from the input memory 1401 to perform a matrix operation with the matrix B, to obtain a partial result or a final result of the matrix, and stores the partial result or the final result in an accumulator 1408.

A unified memory 1406 is configured to store input data and output data. Weight data is directly transferred to the weight memory 1402 by using a storage unit access controller 1405 (DMAC). The input data is also transferred to the unified memory 1406 by using the DMAC.

A BIU is a bus interface unit, namely, a bus interface unit 1410, and is configured to interact between an AXI bus and the DMAC and between the AXI bus and an instruction fetch buffer 1409.

The bus interface unit (BIU) 1410 is used by the instruction fetch buffer 1409 to obtain instructions from an external memory, and is further used by the storage unit access controller 1405 to obtain original data of the input matrix A or the weight matrix B from the external memory.

The DMAC is mainly configured to transfer input data in the external memory DDR to the unified memory 1406, or transfer weight data to the weight memory 1402, or transfer input data to the input memory 1401.

A vector calculation unit 1407 includes a plurality of operation processing units. If necessary, further processing is performed on output of the operation circuit, for example, vector multiplication, vector addition, exponential operation, logarithmic operation, and size comparison. The vector calculation unit 1407 is mainly used for network calculation at a non-convolution/FC layer in a neural network, such as pooling, batch normalization, and local response normalization.

In some implementations, the vector calculation unit 1407 can store a processed output vector in the unified memory 1406. For example, the vector calculation unit 1407 may apply a non-linear function to an output of the operation circuit 1403, for example, a vector of an accumulated value, to generate an activation value. In some implementations, the vector calculation unit 1407 generates a normalized value, a combined value, or both. In some implementations, the processed output vector can be used as an activated input to the operation circuit 1403. For example, the processed output vector can be used at a subsequent layer in the neural network.

The instruction fetch buffer 1409 connected to the controller 1404 is configured to store instructions used by the controller 1404.

The unified memory 1406, the input memory 1401, the weight memory 1402, and the instruction fetch buffer 1409 are all on-chip memories. The external memory is private for a hardware architecture of the NPU.

In the present disclosure, an operation of each layer in each module in a voice feature extraction model, a style separation model, a multi-head attention structure, each sub-feature extraction model, an encoder, a decoder, and an attention structure in a seq2seq neural network, a dialect conversion model, and a voice enhancement model may be performed by the operation circuit 1403 or the vector calculation unit 1407.

The operation circuit 1403 or the vector calculation unit 1407 obtains a parameter value (for example, a first parameter value) through calculation. The host CPU is configured to read a computer program stored in the at least one memory, so that a terminal performs the method performed by the terminal in the foregoing method embodiments.

Figure 15:
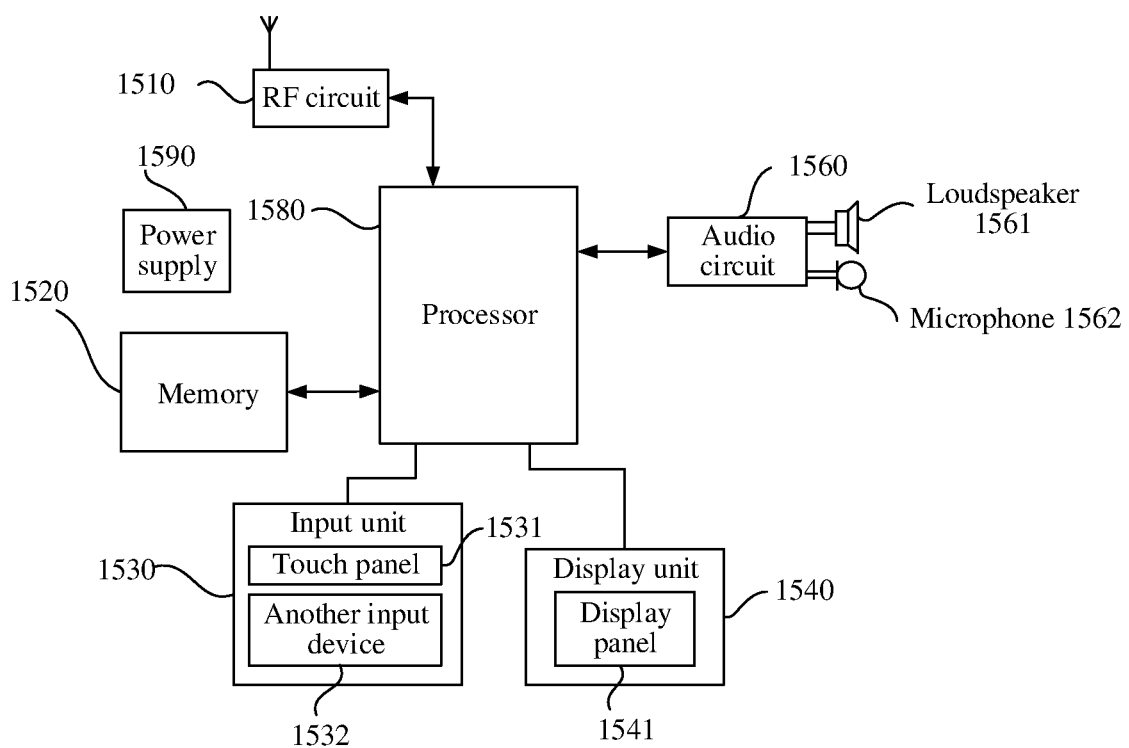
FIG. 15 is a schematic diagram of a structure of another embodiment of a voice conversion apparatus according to an embodiment of the present disclosure.

Refer to FIG. 15. An embodiment of the present invention further provides another voice conversion apparatus. As shown in FIG. 15, only a part related to this embodiment is shown. For specific technical details that are not disclosed, refer to the method part in embodiments of the present disclosure. The voice conversion apparatus may be a terminal. The terminal may be a mobile phone, a tablet computer, a notebook computer, a smartwatch, or the like. An example in which the terminal is a mobile phone is used.

FIG. 15 shows a block diagram of a partial structure of a mobile phone related to the terminal provided in this embodiment of the present invention. Refer to FIG. 15. The mobile phone includes components such as a radio frequency (RF) circuit 1510, a memory 1520, an input unit 1530, a display unit 1540, an audio circuit 1560, a processor 1580, and a power supply 1590. Persons skilled in the art may understand that the structure of the mobile phone shown in FIG. 15 does not constitute a limitation on the mobile phone. The mobile phone may include more or fewer components than those shown in the figure, or may include a combination of some components, or may include different component arrangements.

Each component of the mobile phone is specifically described below with reference to FIG. 15.

The RF circuit 1510 may be configured to receive and send a signal in an information receiving and sending process or a call process. Particularly, after receiving downlink information from a base station, the RF circuit 1510 sends the downlink information to the processor 1580 for processing.

The memory 1520 may be configured to store a software program and a module. By running the software program and the module that are stored in the memory 1520, the processor 1580 executes various function applications of the mobile phone and processes data. The memory 1520 may mainly include a program storage area and a data storage area. The program storage area may store an operating system, an application program required by at least one function (for example, a sound play function), and the like. In addition, the memory 1520 may include a high-speed random access memory, and may further include a non-volatile memory, for example, at least one magnetic disk storage component, a flash memory component, or another volatile solid-state storage component.

The input unit 1530 may be configured to receive input digit or character information, and generate a key signal input related to a user setting and function control of the mobile phone. Specifically, the input unit 1530 may include a touch panel 1531 and another input device 1532. The touch panel 1531 is also referred to as a touchscreen and may collect a touch operation on or near the touch panel 1531 (such as an operation performed by a user on the touch panel 1531 or near the touch panel 1531 by using any proper object or accessory, such as a finger or a stylus), and drive a corresponding connection apparatus according to a preset program. Optionally, the touch panel 1531 may include two parts: a touch detection apparatus and a touch controller. The touch detection apparatus detects a touch orientation of a user, detects a signal brought by the touch operation, and sends the signal to the touch controller. The touch controller receives touch information from the touch detection apparatus, converts the touch information into contact coordinates, and sends the contact coordinates to the processor 1580, and can receive and execute a command sent by the processor 1580. The input unit 1530 may further include another input device 1532 in addition to the touch panel 1531. Specifically, the another input device 1532 may include but is not limited to one or more of a physical keyboard, a function key (such as a volume control key or an on/off key), a trackball, a mouse, a joystick, and the like.

In the present disclosure, the input unit 1530 is configured to receive various operations input by the user, for example, a mode selection operation. A function of the input module 1320 in FIG. 13 may be performed by the input unit 1530, or a function of the obtaining module 1330 in FIG. 13 may be performed by the input unit 1530.

The display unit 1540 may be configured to display information input by the user or information provided for the user, and various menus of the mobile phone. The display unit 1540 may include a display panel 1541. Optionally, the display panel 1541 may be configured in a form of a liquid crystal display (LCD), an organic light-emitting diode (OLED), or the like. Further, the touch panel 1531 may cover the display panel 1541. When detecting a touch operation on or near the touch panel 1531, the touch panel 1531 transmits the touch operation to the processor 1580 to determine a type of a touch event, and then the processor 1580 provides a corresponding visual output on the display panel 1541 based on the type of the touch event. In FIG. 15, the touch panel 1531 and the display panel 1541 act as two independent components to implement input and output functions of the mobile phone. However, in some embodiments, the touch panel 1531 and the display panel 1541 may be integrated to implement the input and output functions of the mobile phone.

In the present disclosure, the display unit 1540 is configured to display corresponding APP interfaces shown in FIG. 6A, FIG. 6B, FIG. 11A, and FIG. 11B in the method embodiments.

The audio circuit 1560, a loudspeaker 1561, and a microphone 1562 may provide an audio interface between the user and the mobile phone. The audio circuit 1560 may transmit an electrical signal converted from received audio data to the loudspeaker 1561, and the loudspeaker 1561 converts the electrical signal into a sound signal for output. In another aspect, the microphone 1562 converts the collected sound signal into an electrical signal, the audio circuit 1560 receives the electrical signal, converts the electrical signal into audio data, and then the audio circuit 1560 outputs the audio data to the processor 1580 for processing.

In the present disclosure, the audio circuit 1560 receives a first voice of a first speaker or receives a third voice of a second speaker by using the microphone 1562. The loudspeaker 1561 is configured to output a processed second voice. For example, the second voice is a voice obtained after style conversion, the second voice is a voice obtained after dialect conversion, or the second voice is a voice obtained after voice enhancement. The loudspeaker 1561 is configured to output the second voice.

In a possible design, a function of the output module 1340 in FIG. 13 may be performed by the loudspeaker 1561.

The processor 1580 is a control center of the mobile phone and is connected to each part of the entire mobile phone by using various interfaces and lines. By running or executing the software program and/or module that are stored in the memory 1520 and invoking data stored in the memory 1520, the processor 1580 implements various functions of the mobile phone and processes data, to perform overall monitoring on the mobile phone. Optionally, the processor 1580 may include one or more processing units.

The mobile phone further includes the power supply 1590 (such as a battery) that supplies power to each part. Preferably, the power supply may be logically connected to the processor 1580 by using a power management system, to implement management functions such as charging management, discharging management, and power consumption management by using the power management system.

Although not shown, the mobile phone may further include a camera, a Bluetooth module, and the like. Details are not described herein.

In the present disclosure, when program instructions stored in the memory are executed by the processor, the methods performed by the terminal in the foregoing method embodiments are implemented. For details, refer to the descriptions in the foregoing method embodiments. Details are not described herein again.

An embodiment of the present disclosure further provides a computer-readable storage medium. The computer-readable storage medium stores a program. When the program is run on a computer, the computer is enabled to perform the steps performed by the terminal device in the methods described in the foregoing method embodiments.

An embodiment of the present disclosure further provides a computer program product. When the computer program product is run on a computer, the computer is enabled to perform the steps performed by the terminal in the methods described in the foregoing method embodiments.

An embodiment of the present disclosure further provides a circuit system. The circuit system includes a processing circuit, and the processing circuit is configured to perform the steps performed by the terminal device in the methods described in the foregoing method embodiments.

In another possible design, when the apparatus is a chip in the terminal, the chip includes a processing unit and a communication unit. The processing unit may be, for example, a processor, and the communication unit may be, for example, an input/output interface, a pin, or a circuit. The processing unit may execute computer-executable instructions stored in a storage unit, so that the chip in the terminal performs the voice conversion method in any one of the implementations of the first aspect. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that can store static information and instructions, a random access memory (RAM), and the like.

Any processor mentioned above may be a general-purpose central processing unit (CPU), a microprocessor, an application-specific integrated circuit (ASIC), or one or more integrated circuits configured to control program execution in the voice conversion method in the first aspect.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in another manner. The described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objective of the solutions of embodiments.

In addition, functional units in embodiments of the present disclosure may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of the present disclosure.

What is claimed is:

1. A voice conversion method, comprising:
   receiving a mode selection operation input by a user, wherein the mode selection operation is for selecting a voice conversion mode;
   selecting a target conversion mode from a plurality of conversion modes based on the mode selection operation, wherein the plurality of conversion modes comprises a style conversion mode, a dialect conversion mode, and a voice enhancement mode, and each of the plurality of conversion modes corresponds to one of multiple voice processing neural networks comprising a style conversion network, a dialect conversion network, and a voice enhancement network;
   selecting, among the multiple voice processing neural networks, a target voice conversion network corresponding to the selected target conversion mode:
   obtaining a to-be-converted first voice;
   extracting feature information of the first voice;
   inputting the feature information of the first voice into target voice conversion network corresponding to the selected target conversion mode, and outputting, over the target voice conversion network, a second voice obtained through conversion; and outputting the second voice.

2. The method according to claim 1, wherein the extracting feature information of the first voice comprises:
inputting the feature information of the first voice into a voice feature extraction model, and extracting a phoneme posteriorgram (PPG) feature of the first voice by using the voice feature extraction model, wherein the PPG feature is for retaining content information of the first voice.

3. The method according to claim 1, wherein the target conversion mode is the style conversion mode, the target voice conversion network is a style conversion network including a style separation model and a voice fusion model, and the method further comprises:
obtaining a third voice for extracting a style feature;
inputting the third voice into the style separation model, and separating the style feature of the third voice by using the style separation model; and
the inputting the feature information of the first voice into a target voice conversion network corresponding to the target conversion mode, and outputting, over the target voice conversion network, a second voice obtained through conversion comprises:
inputting the style feature and the feature information of the first voice into the voice fusion model for fusion, to obtain the second voice.

4. The method according to claim 3, wherein the style feature comprises a first feature including a plurality of sub-features; and
the inputting the third voice into the style separation model, and separating the style feature of the third voice by using the style separation model comprises:
inputting the third voice into the style separation model, and extracting a vector of the first feature of the third voice by using the style separation model;
inputting the third voice into a sub-feature extraction model, and extracting a vector of each of the plurality of sub-features by using the sub-feature extraction model;
receiving a weight of each of the plurality of sub-features that is input by the user; and
determining the style feature of the third voice based on the vector of the first feature, and the vector and weight of each of the plurality of sub-features.

5. The method according to claim 4, wherein the determining the style feature of the third voice based on the vector of the first feature, and the vector and weight of each of the plurality of sub-features comprises:
inputting the vector of the first feature into a multi-head attention structure, inputting the vector of each of the plurality of sub-features and a product of the vector of each of the plurality of sub-features and the weight corresponding to the sub-feature into the multi-head attention structure, and outputting the style feature of the third voice by using the multi-head attention structure.

6. The method according to claim 3, wherein the obtaining a third voice for extracting a style feature comprises:
receiving a template selection operation input by the user, wherein the template selection operation is for selecting a target template; and
obtaining a voice corresponding to the target template, and using the voice corresponding to the target template as the third voice.

7. The method according to claim 3, wherein the obtaining a third voice for extracting a style feature comprises:

receiving the third voice input by a second speaker, wherein the first voice is a voice of a first speaker, and the second speaker is a person different from the first speaker.

8. The method according to claim 1, wherein the target conversion mode is the dialect conversion mode, the target voice conversion network is a dialect conversion network, the inputting the feature information of the first voice into a target voice conversion network corresponding to the target conversion mode, and outputting, over the target voice conversion network, a second voice obtained through conversion comprises:
inputting the feature information of the first voice into the dialect conversion network, and outputting the second voice over the dialect conversion network, wherein the first voice is a voice of a first dialect, and the second voice is a voice of a second dialect.

9. The method according to claim 8, wherein the dialect conversion network comprises a plurality of dialect conversion models, each of which is for a different dialect to be converted, and the method further comprises:
receiving a selection operation input by the user; and
inputting the feature information of the first voice into a dialect conversion model corresponding to the selection operation, and outputting the second voice by using the dialect conversion model corresponding to the selection operation.

10. The method according to claim 8, further comprising:
inputting the first voice into a style separation model, and separating a style feature of the first voice by using the style separation model; and
the inputting the feature information of the first voice into the dialect conversion network, and outputting the second voice over the dialect conversion network comprises:
inputting the style feature of the first voice and the feature information of the first voice into the dialect conversion network, and outputting the second voice over the dialect conversion network, wherein a style of the second voice is the same as that of the first voice.

11. The method according to claim 1, wherein the first voice is a far-field voice, the target conversion mode is the voice enhancement mode, the target voice conversion network is a voice enhancement model, the inputting the feature information of the first voice into a target voice conversion network corresponding to the target conversion mode, and outputting, over the target voice conversion network, a second voice obtained through conversion comprises:
inputting the feature information of the first voice into a voice enhancement model corresponding to the mode, and outputting the second voice by using the voice enhancement model, wherein the second voice is a near-field voice.

12. The method according to claim 11, further comprising:
inputting the first voice into a style separation model, and separating a style feature of the first voice by using the style separation model; and
inputting the feature information of the first voice into a voice enhancement model corresponding to the mode, and outputting the second voice by using the voice enhancement model comprises:
inputting the style feature of the first voice and the feature information of the first voice into the voice enhancement model, and outputting the second voice by using the voice enhancement model, wherein a style of the second voice is the same as that of the first voice.

13. The method according to claim 7, wherein the obtaining a to-be-converted first voice comprises:
receiving the first voice input by the first speaker; or
selecting the first voice from a local storage file.

14. A terminal device, comprising at least one processor, wherein the at least one processor is coupled to a memory, the memory stores program instructions; and when the program instructions stored in the memory are executed by the at least one processor, cause the at least one processor to perform operations comprising:
receiving a mode selection operation input by a user, wherein the mode selection operation is for selecting a voice conversion mode;
selecting a target conversion mode from a plurality of conversion modes based on the mode selection operation, wherein the plurality of conversion modes comprises a style conversion mode, a dialect conversion mode, and a voice enhancement mode, and each of the plurality of conversion modes corresponds to one of multiple voice processing neural networks comprising a style conversion network, a dialect conversion network, and a voice enhancement network;
selecting, among the multiple voice processing neural networks, a target voice conversion network corresponding to the selected target conversion mode;
obtaining a to-be-converted first voice;
extracting feature information of the first voice;
inputting the feature information of the first voice into target voice conversion network corresponding to the selected target conversion mode, and outputting, over the target voice conversion network, a second voice obtained through conversion; and
outputting the second voice.

15. The terminal device according to claim 14, wherein the extracting feature information of the first voice comprises:
inputting the feature information of the first voice into a voice feature extraction model, and extracting a phoneme posteriorgram (PPG) feature of the first voice by using the voice feature extraction model, wherein the PPG feature is for retaining content information of the first voice.

16. The terminal device according to claim 14, wherein the target conversion mode is the style conversion mode, the target voice conversion network is a style conversion network including a style separation model and a voice fusion model, and the operations further comprise:
obtaining a third voice for extracting a style feature;
inputting the third voice into the style separation model, and separating the style feature of the third voice by using the style separation model; and
the inputting the feature information of the first voice into a target voice conversion network corresponding to the target conversion mode, and outputting, over the target voice conversion network, a second voice obtained through conversion comprises:
inputting the style feature and the feature information of the first voice into the voice fusion model for fusion, to obtain the second voice.

17. The terminal device according to claim 16, wherein the style feature comprises a first feature including a plurality of sub-features; and the inputting the third voice into the style separation model, and separating the style feature of the third voice by using the style separation model comprises:
inputting the third voice into the style separation model, and extracting a vector of the first feature of the third voice by using the style separation model;
inputting the third voice into a sub-feature extraction model, and extracting a vector of each of the plurality of sub-features by using the sub-feature extraction model;
receiving a weight of each of the plurality of sub-features that is input by the user; and
determining the style feature of the third voice based on the vector of the first feature, the vector and weight of each of the plurality of sub-features.

18. The terminal device according to claim 17, wherein the determining the style feature of the third voice based on the vector of the first feature, the vector and weight of each of the plurality of sub-features comprises:
inputting the vector of the first feature into a multi-head attention structure, inputting the vector of each of the plurality of sub-features and a product of the vector of each of the plurality of sub-features and the weight corresponding to the sub-feature into the multi-head attention structure, and outputting the style feature of the third voice by using the multi-head attention structure.

19. A non-transitory computer-readable storage medium, comprising a program, wherein when the program is run on a computer, the computer is enabled to perform operations comprising:
receiving a mode selection operation input by a user, wherein the mode selection operation is for selecting a voice conversion mode;
selecting a target conversion mode from a plurality of conversion modes based on the mode selection operation, wherein the plurality of conversion modes comprises a style conversion mode, a dialect conversion mode, and a voice enhancement modes, and each of the plurality of conversion modes corresponds to one of multiple voice processing neural networks comprising a style conversion networks, a dialect conversion network, and a voice enhancement network;
selecting, among the multiple voice processing neural networks, a target voice conversion network corresponding to the selected target conversion mode;
obtaining a to-be-converted first voice;
extracting feature information of the first voice;
inputting the feature information of the first voice into the target voice conversion network corresponding to the selected target conversion mode, and outputting, over the target voice conversion network, a second voice obtained through conversion; and
outputting the second voice.

20. The non-transitory computer-readable storage medium according to claim 19, wherein the extracting feature information of the first voice comprises:
inputting the feature information of the first voice into a voice feature extraction model, and extracting a phoneme posteriorgram (PPG) feature of the first voice by using the voice feature extraction model, wherein the PPG feature is for retaining content information of the first voice.

* * * * *

UNITED STATES PATENT AND TRADEMARK OFFICE
CERTIFICATE OF CORRECTION

Page 1 of 1

PATENT NO. : 12,475,878 B2
APPLICATION NO. : 18/186285
DATED : November 18, 2025
INVENTOR(S) : Fan Fan It is certified that error appears in the above-identified patent and that said Letters Patent is hereby corrected as shown below:

In the Specification

Column 7, Line 40, change "This application" to --The present disclosure--;

Column 7, Line 45, change "embodiment of this application," to --embodiment,--;

In the Claims

Column 26, Claim 1, Line 64, change "target voice" to --the target voice--;

Column 29, Claim 14, Lines 29 and 30, change "target voice" to --the target voice--;

Column 30, Claim 19, Line 38, change "modes" to --mode--; and

Column 30, Claim 19, Line 41, change "networks" to --network--.

Signed and Sealed this
Sixth Day of January, 2026

John A. Squires
*Director of the United States Patent and Trademark Office*